US008038535B2

(12) United States Patent
Jensen

(10) Patent No.: US 8,038,535 B2
(45) Date of Patent: Oct. 18, 2011

(54) COLLABORATIVE ONLINE GAMING SYSTEM AND METHOD

(75) Inventor: Jesper Jensen, Atlanta, GA (US)

(73) Assignee: Electronic Arts Inc., Redwood City, CA (US)

( * ) Notice: Subject to any disclaimer, the term of this patent is extended or adjusted under 35 U.S.C. 154(b) by 581 days.

(21) Appl. No.: 11/435,283

(22) Filed: May 17, 2006

(65) Prior Publication Data

US 2006/0287106 A1 Dec. 21, 2006

Related U.S. Application Data

(60) Provisional application No. 60/681,466, filed on May 17, 2005, provisional application No. 60/798,185, filed on May 8, 2006.

(51) Int. Cl.
*A06F 9/24* (2006.01)
*G63F 17/00* (2006.01)

(52) U.S. Cl. ........... 463/42; 463/25; 463/41; 463/40; 463/43; 715/739; 705/1; 709/227

(58) Field of Classification Search .............. 463/42
See application file for complete search history.

(56) References Cited

U.S. PATENT DOCUMENTS

| | | | | | |
|---|---|---|---|---|---|
| 5,813,913 | A | * | 9/1998 | Berner et al. | 463/40 |
| 5,961,386 | A | * | 10/1999 | Sawaguchi | 463/43 |
| 5,964,660 | A | * | 10/1999 | James et al. | 463/1 |
| 6,128,660 | A | * | 10/2000 | Grimm et al. | 709/227 |
| 6,699,125 | B2 | * | 3/2004 | Kirmse et al. | 463/42 |
| 7,240,093 | B1 | * | 7/2007 | Danieli et al. | 709/205 |
| 7,288,028 | B2 | * | 10/2007 | Rodriquez et al. | 463/42 |
| 7,430,719 | B2 | * | 9/2008 | Pettinati et al. | 715/739 |
| 7,470,197 | B2 | * | 12/2008 | Massey et al. | 463/42 |
| 7,549,125 | B2 | * | 6/2009 | Dunn et al. | 715/739 |
| 7,636,719 | B2 | * | 12/2009 | Thompson et al. | 1/1 |
| 2002/0037767 | A1 | * | 3/2002 | Ebin | 463/25 |
| 2002/0086732 | A1 | * | 7/2002 | Kirmse et al. | 463/42 |
| 2004/0097287 | A1 | | 5/2004 | Postrel | |
| 2004/0192440 | A1 | * | 9/2004 | Evans et al. | 463/30 |
| 2005/0033601 | A1 | | 2/2005 | Kirby et al. | |

OTHER PUBLICATIONS

Lee, K.;Ko, B.;Calo,S. Adaptive Server Selection for Large Scale Interactive Online Games. In Proceedings of the 14th International Workshop on Network and Operating Systems Support for Digital Audio and Video, pp. 152-157. ACM Press, 2004 [online ] [retrieved Jun. 27, 2007]. Retrieved from the Internet: URL: http://dna-wsl.cs.columbia.edu/publications/Lee2004_Adaptive_Server_NOSS DAV. pdf especially p. 2, para 3-6; p. 3 para 5 p. 4 para 2.
International Search Report Application PCT/US/06/18957 dated Aug. 17, 2007.

* cited by examiner

*Primary Examiner* — Paul A. D'Agostino

(57) ABSTRACT

A system, method, and computer program product for collaborative online gaming, including at least one of providing a central repository master browser system; providing an experience calibrated match-making service; providing a dynamic multiplayer server component auto deployment and aggregation system; providing a lobby centric simultaneous and collaborative client game play launching feature; and providing a video game screen over-layer technology giving users access to a control interface while inside a video game being played.

10 Claims, 71 Drawing Sheets

COLLABORATIVE ONLINE GAMING SYSTEM AND METHOD

CROSS REFERENCE TO RELATED DOCUMENTS

The present application claims priority to U.S. provisional patent application Ser. No. 60/681,466 of JENSEN, entitled "COLLABORTIVE ONLINE GAMING SYSTEM AND METHOD," filed on May 17, 2005, and U.S. provisional patent application Ser. No. 60/798,185, of JENSEN, entitled "COLLABORTIVE ONLINE GAMING SYSTEM AND METHOD," filed on May 8, 2006, the entire disclosures of all of which are hereby incorporated by reference herein.

BACKGROUND OF THE INVENTION

1. Field of the Invention

The present invention generally relates to online gaming systems and methods, and more particularly to an improved collaborative online gaming system and method.

2. Discussion of the Background

In recent years, online gaming systems and methods have been developed. However, the present online gaming systems and methods do provide robust collaborative online gaming.

SUMMARY OF THE INVENTION

Therefore, there is a need for a method and system for a collaborative online gaming that addresses problems with conventional online gaming systems and methods. The above and other needs are addressed by the exemplary embodiments of the present invention, which provide a novel collaborative online gaming system and method.

Accordingly, in exemplary aspects of the present invention, a system, method, and computer program product for collaborative online gaming are provided. The system, method, and computer program product can include at least one of providing a central repository master browser system; providing an experience calibrated match-making service; providing a dynamic multiplayer server component auto deployment and aggregation system; providing a lobby centric simultaneous and collaborative client game play launching feature; and providing a video game screen over-layer technology giving users access to a control interface while inside a video game being played Still other aspects, features, and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
FIGS. 1-40 illustrate a collaborative online gaming system and method, according to exemplary embodiments.
Figure 2:
Figure 3:
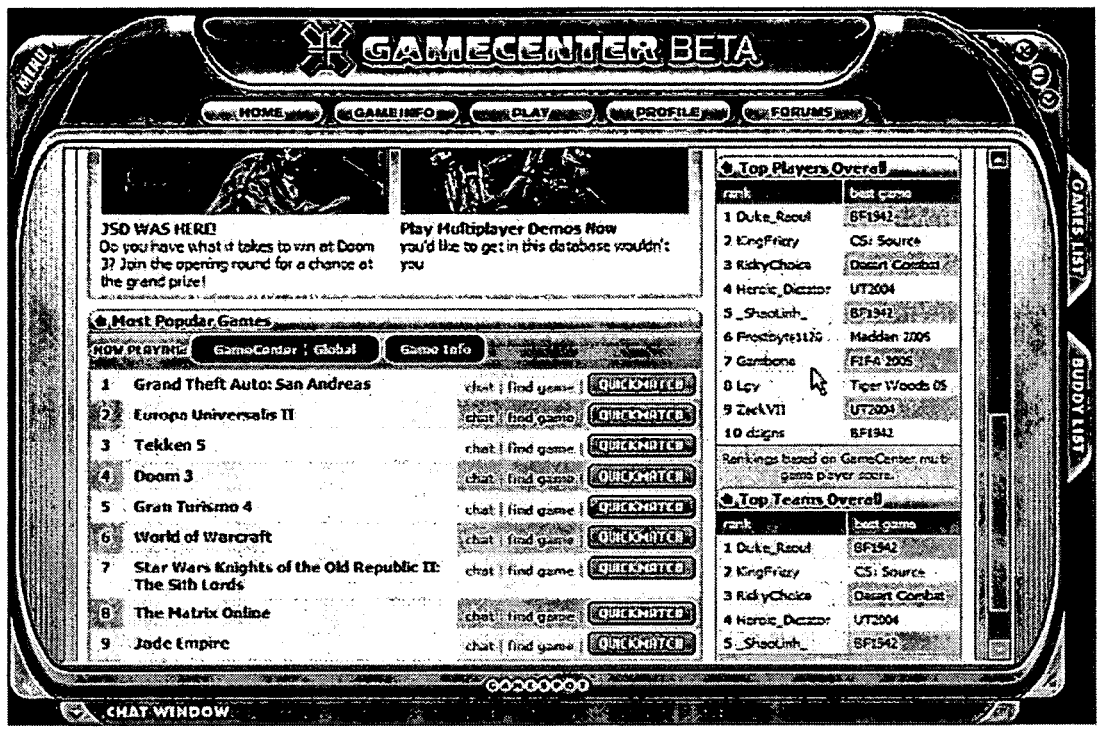
Figure 4:
Figure 5:
Figure 6:
Figure 7:
Figure 8:
Figure 9:
Figure 10:
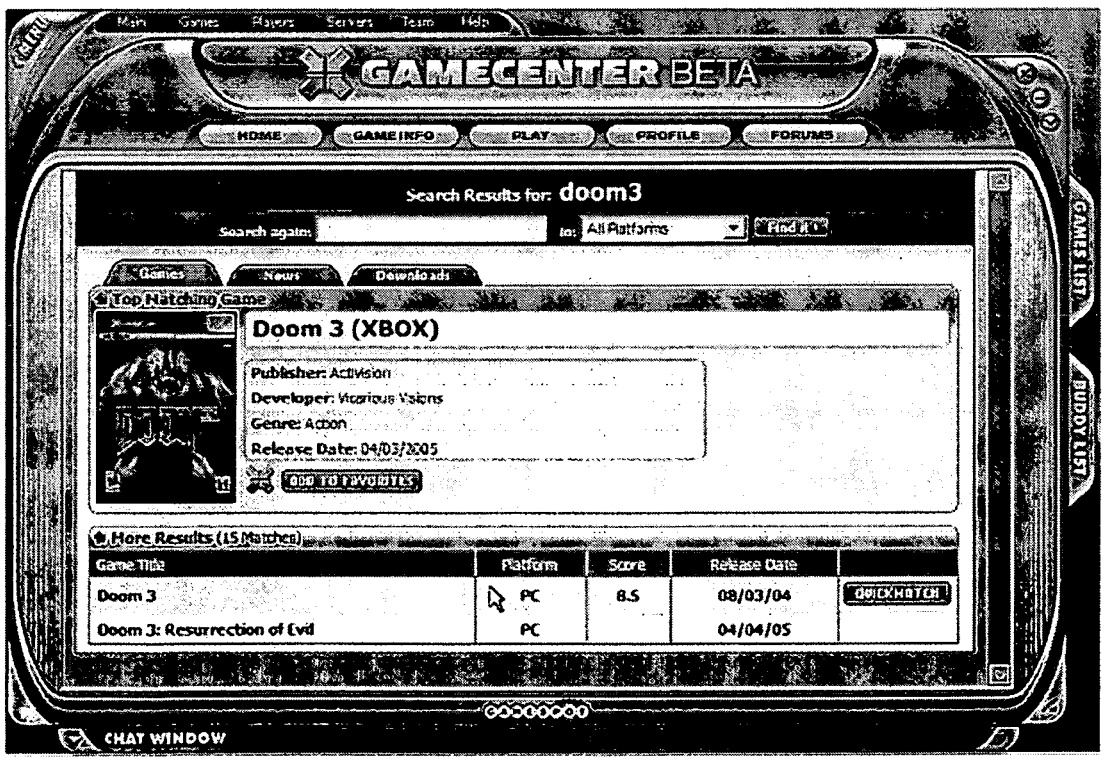
Figure 11:
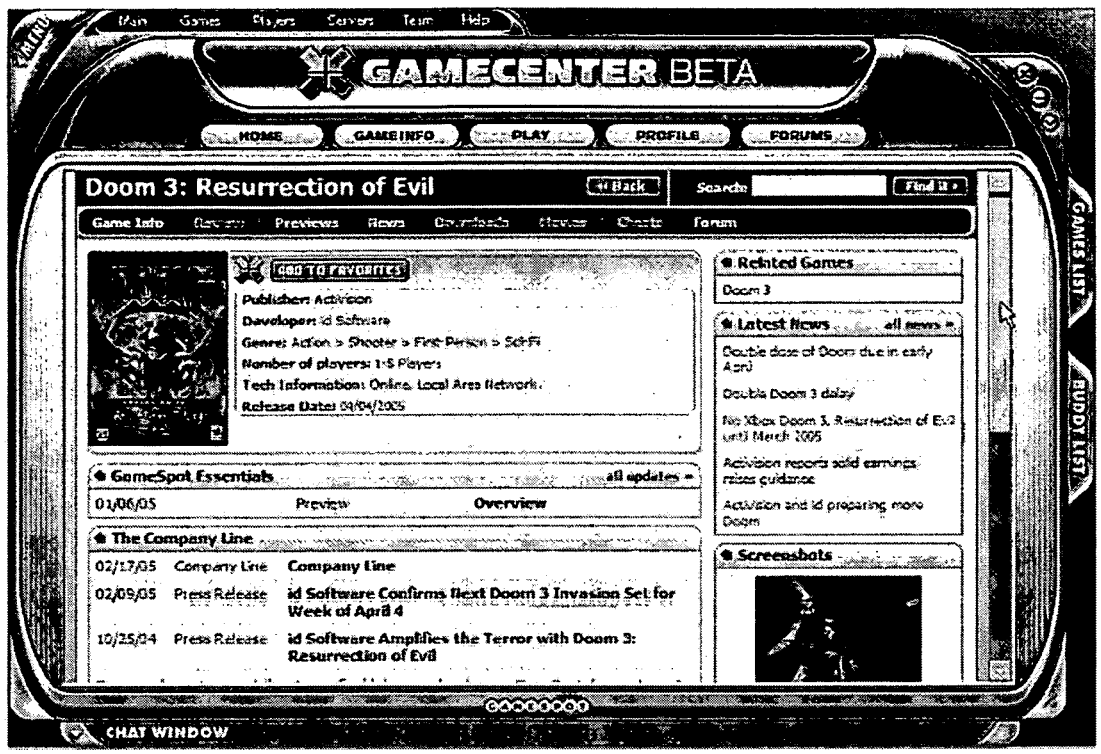
Figure 12:
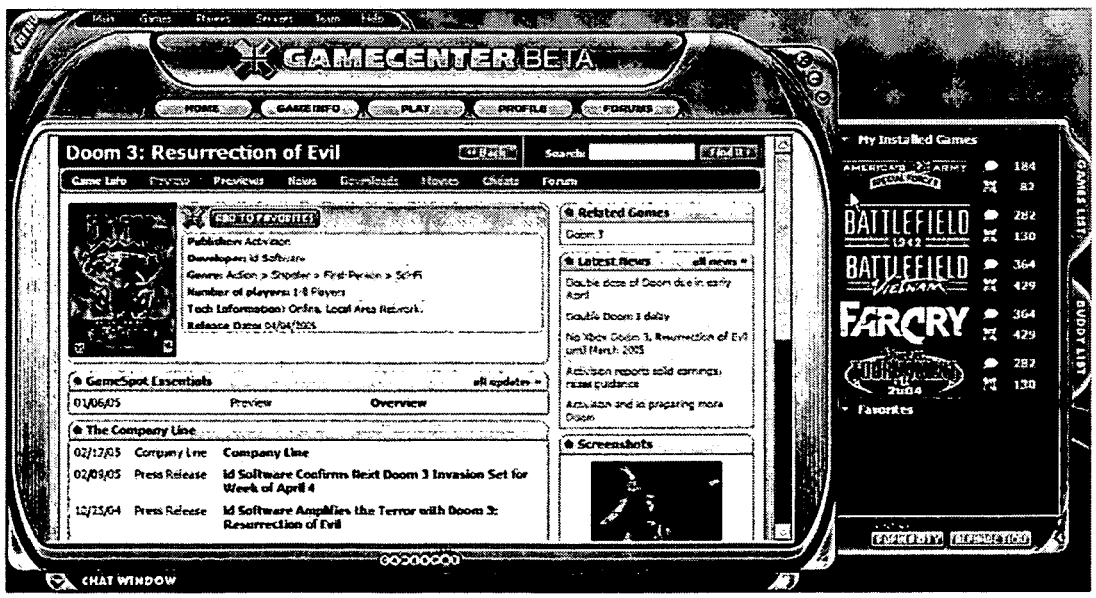
Figure 13:
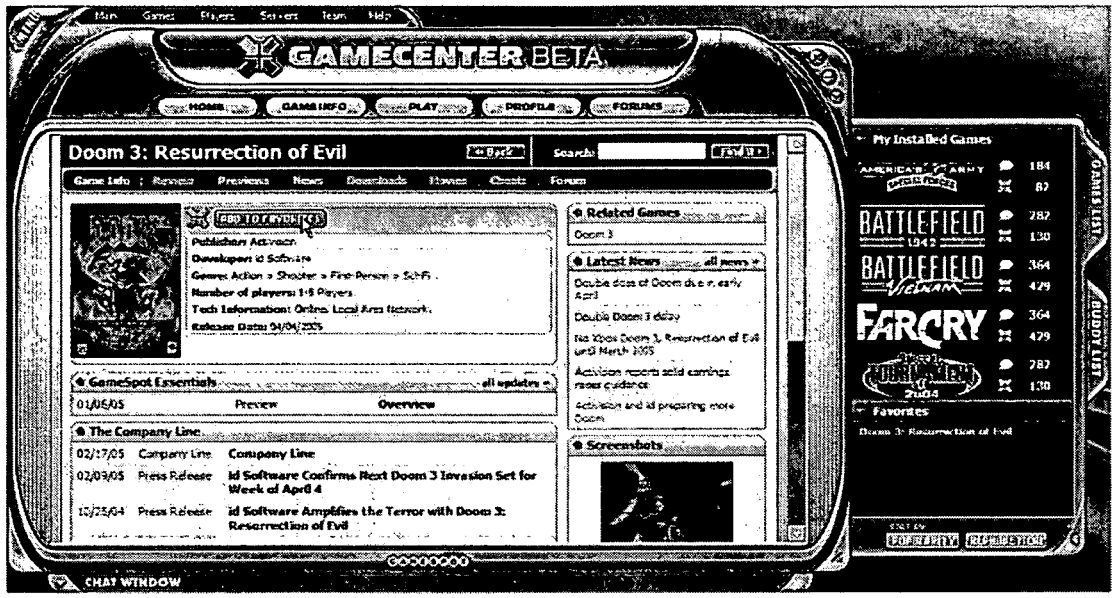
Figure 82:

Referring now to the drawings, wherein like reference numerals designate identical or corresponding parts throughout the several views, and more particularly to FIGS. 1-82 thereof, there is illustrated a novel collaborative online gaming system and method, according to exemplary embodiments of the present invention.

The exemplary embodiments are directed to a novel collaborative online gaming system and method (e.g., referred to as GameCenter, PlayLinc, and Orion Framework), including a multi-player gaming platform with gaming content functionality, gaming community functionality, and the like. The exemplary system and method can be adapted with various versions, for example, including a Verizon version available to Verizon users, and the like, respective versions licensed to $3^{rd}$ parties, who can operate the exemplary system and method in a private label manner, and the like.

Exemplary Ways to Get into a Game

Using the game set up tools from the exemplary system and method, a member can invite others to join him in launching a game. He can do so by dragging people from his buddy list, from the chat room associated with the game, and the like.

Invites go out and those who accept go into a lobby. There's a countdown and game play begins by starting the game application together with the players in the lobby.

Dedicated (e.g., operated by the exemplary system and method) dynamic game server. This need not be a P2P server like the Diablo/Halo 2 example below and need not be a static server operated by Verizon (e.g., need not be a single physical box running a set game server instance). This dynamic element distinguishes the exemplary system and method infrastructure from others—the exemplary system and method need not dedicate servers to a specific game or set of game instances.

The exemplary system and method can use servers dynamically based on what gamers want to do at any given time. The exemplary system and method can shift an in-process game from one server to another, the exemplary system and method can have 10 servers playing 1 game (multiple instances per server) or 1 server playing 5 games (5 instances per server). All of this can be dynamically controlled by the exemplary system and method with such controls transparent to the gamer(s). Gamers via the exemplary system and method also have the opportunity to configure the style of servers they want to play, and the launching of new server instances can happen on demand (e.g., in about 20 seconds after the user hits Go).

Side Door Entrance into in-Progress Game

As is the case with multi-player gaming platform, a user can use a "player matching" utility to see where a particular game is being played. There are tons of player matching utilities available, including from within a multi-player game itself and the exemplary system and method includes a matching utility. The matching utility need not involve the use of a "buddy list" or instant messaging (I.M.) functionality. By contrast, the matching utility of the exemplary system and method can give a gamer a list of games being played on servers of the exemplary system and method and elsewhere. Once the gamer finds an instance of the game he's looking for, he can join that game, wherever it might be.

Side Door Entrance #2 to in-Progress Game

Using the buddy list that resides of the exemplary system and method, a gamer can see the server his buddy last went to. He can then go to a server list of the exemplary system and method and click to enter that server himself. This capability can be implemented for dynamic servers of the exemplary system and method, as well as any suitable server (e.g., of the exemplary system and method, external, etc.) that a user's friends connect to via the exemplary system and method.

Also, what the buddy list can show is the last server that the buddy went to from the exemplary system and method. If that buddy has left that server and moved on to another without using the exemplary system and method's matching tools to do so (e.g., if the buddy has used the player matching utility inside his game instead), then a gamer of the exemplary system and method need not see the new server info (e.g., the exemplary system and method can track which server a gamer has gone to from the exemplary system and method's matching tool). This is different from Xfire/Yahoo, since Xfire/Yahoo puts a tag on the game itself and tracks where the gamer and his game goes—so Xfire/Yahoo can definitely track from server to server to server.

Further exemplary embodiments, however, allow a gamer to see on his buddy list what server his buddy is on even if that server isn't a server of the exemplary system and method. This allows the gamer to see where his buddy is even if his buddy is out on a server on the Internet that isn't a server of the exemplary system and method. The exemplary system and method then can be configured to let the gamer click on the server that isn't a server of the exemplary system and method in an adjacent server list to join that server.

With Xfire/Yahoo, new or late joiner can look at his Buddy List (I.M. client) to see what his friend(s) are playing. By clicking on the location shown next to a buddy, the new player is transported to the server where his buddy is playing the game. Xfire does not operate any servers itself. Xfire's/Yahoo's method may rely on monitoring the network stack or the game application. This information is then either sent peer-to-peer (push) to a user's buddy list, received peer-to-peer (pull) on a buddy's request, or stored in a central database. Xfire also includes a generic player matching utility that allows a user to see where certain games are being played on the Internet. The user can click on one of these servers and be transported to it to enter the game on that server's terms.

However, unlike the technology of the exemplary system and method, Xfire's/Yahoo's technology places a "tag" on a user's game software when that game software is opened from within (or in connection with the use of) Xfire. This enables the user to be tracked from server to server as long as the game is open. By contrast, the technology of the exemplary system and method tracks a user's activity by recording the last server the user went to from within the exemplary system and method. For example, if a user of the exemplary system and method opens Half-Life 2 while using the exemplary system and method and goes to a particular server, the exemplary system and method tracks that move. But if that user then leaves that server and goes to another server on his own server without using the exemplary system and method, then the exemplary system and method need not track that move. However, with Xfire/Yahoo the tag is attached to the game, so Xfire's application sees that beacon regardless of whether the gamer chooses a new server through Xfire.

With peer-to-peer games (e.g., Starcraft, Halo 2), users go to a game-specific "lobby" (e.g., such as with Diablo for PC from 1996, Halo 2 for Xbox from 2004, etc.), where they congregate, get a group together, and then launch game play on a server running on one of the players PCs (or Xboxes). While getting into a lobby might involve a buddy list, the buddy list isn't used to join the server itself. Gamers find their friends in the lobby by chance or because they have communicated using tools not related to the game-specific lobby.

Depending on the nature of the game (e.g., client-server type games), late corners can join a game in progress by using a standard player matching service/application to find a game in progress. For example, with client-server games (e.g., PC action games like Quake from 1996 or Half-Life 2 from 2004), the hosting gamer starts a game server on a physical box he owns (e.g., on a home or office network) or leases (e.g., via various services). As a part of the game's code, the hosted game server reports to a game publisher's (or e.g., GameSpy's) master server that the game server is available, so that the game server appears in the lists of the many server browser applications that are available (e.g., as $3^{rd}$ party applications or built into the game application). Then, via a server browser or by telling friends the specific IP address, other players join the hosted game server and play for an indefinite period (e.g., maps can rotate, modes can change without players being disconnected and reconnected). These configurations work with large numbers of players (e.g., 16-128). By contrast, the exemplary system and method provides lobbies before starting a game server of the above type.

Overview

The are well recognized providers of gaming content (e.g., Verizon, Gamespot, etc.) that includes gaming related reviews, previews, downloads and patches, as well as specialty video and other gaming content and which can be included with the exemplary system and method. The exemplary system and method also employs well established providers of backend infrastructure and support for high speed online multiplayer video gaming with contracts with the vast majority of the top developers and publishers of multiplayer video games (e.g., SCI, etc.). The exemplary system and method provides a turnkey, full featured gaming application, available for free including premium services on a monthly subscription basis, primarily for the broadband, hardware, portal and publisher distribution channel. The exemplary system and method allows gamers to join or start a high-speed dynamically customized server for any suitable game at any suitable time, as well as providing multiple other features and vast gaming content.

Content providers (e.g., Verizon, Gamespot, etc.) can bring to their version of the exemplary system and method content on a real-time or near real-time basis, while the providers of backend infrastructure and support (e.g., SCI, etc.) bring to the exemplary system and method backend infrastructure for gameplay, including dynamic customized configurable game servers over a wide variety of popular gaming titles. Accordingly, the exemplary system and method, advantageously, provides various features, including buddy lists, team management, instant messaging, multiplexed chat, general and in-game menu and VoIP, dynamic server launching with invite to play features, QuickPlay, experience levels and statistics, and a number of other features that effectively make the exemplary system and method a one-click, on the desktop destination for gamers—an OS for gaming.

When the exemplary system and method is first launched, it runs a quick scan to find all of the games currently installed on the PC, as a convenience factor to immediately prepare the application's gaming features for the games that the user already has installed. Upon subsequent launch, the exemplary system and method can automatically update itself if a newer client of the exemplary system and method is available, and can quickly rescan the version of the games that are already installed in order to prompt the gamer if any of their current games need to be updated or patched.

Homepage (FIGS. 1-3, and 41-44)

Figure 44:

After a secure login (FIG. 41), the Main homepage (FIGS. 1-2, and 42-44) of the exemplary system and method can be presented. The Main homepage can be minimized on to the desktop (FIG. 44). The exemplary system and method makes the most of the homepage by promoting the latest content, announce upcoming events (e.g., tournaments), announcing new features, targeting the most popular games, and the like. The latest news also can be presented and full news stories are available with a single click. GameCenter and VGN (Verizon Game Network) are both first iterations of the technology of the exemplary system and method.

The homepage can also provide a window to the competitive landscape (FIG. 3) in the exemplary system and method, with player and team leader-boards for popular games and can also allow a gamer to jump straight into a game.

Top Menu (FIGS. 4-8)

The top menu of the exemplary system and method provides one integrated method of navigation. However, there are multiple methods of navigation through the exemplary system and method.

Gameinfo (FIGS. 9-11 and 52-54)

The game info page (FIGS. 9-10 and 52) has deep content on all covered games and due to the magnitude of content available, incorporates a search function for locating a particular game. If, for example, a search for Doom3 is made, the exemplary system and method brings up the detailed game information for that game.

From the information page, the gamer can access various content related to the game (FIGS. 11, 53-54), including high-quality video's, available downloads, game strategy, and the like. The exemplary system and method also can include various licensed file libraries (e.g., some 12,000 downloads and over 26,000 movies) and also can includes free demos, game updates, other content, and the like, that the gamer can use for gaming either in multi-player or single-player gaming.

Gamers also can order games from certified online merchants or download try-and-buy, on-demand game trials. But the exemplary system and method is much more than a really cool Web browser.

Gamelist (FIGS. 12-15, and 46-51)

The games list (FIGS. 12-13, and 46-51) helps the gamer keep track of both games that they already have installed, as well as games they have bookmarked as Favorites. For example, a gamer can easily add Doom3 to the favorite's section with one click.

Figure 14:
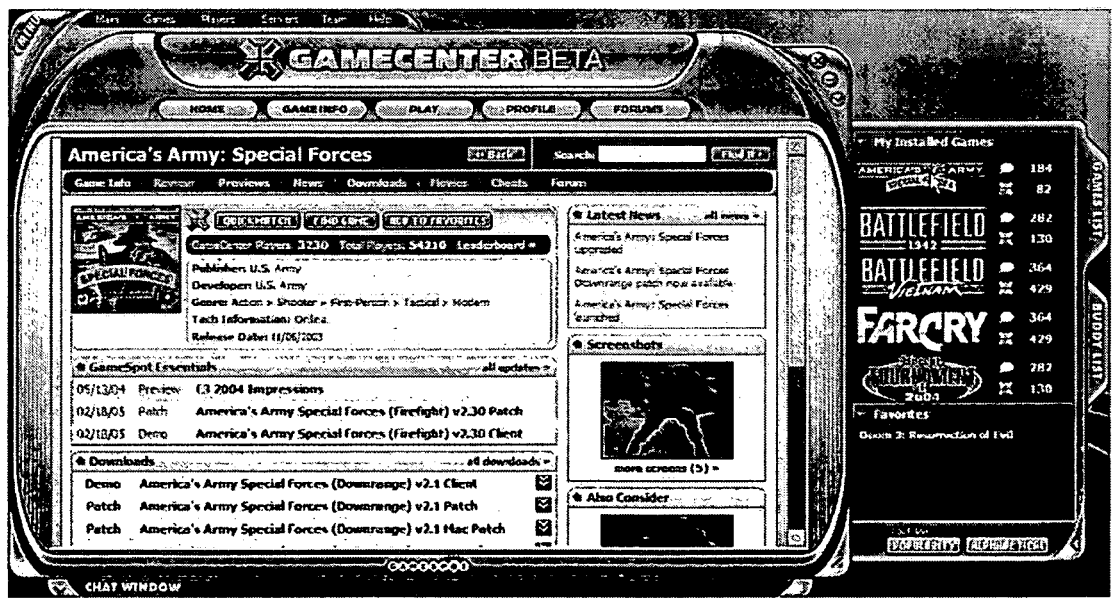
Figure 15:
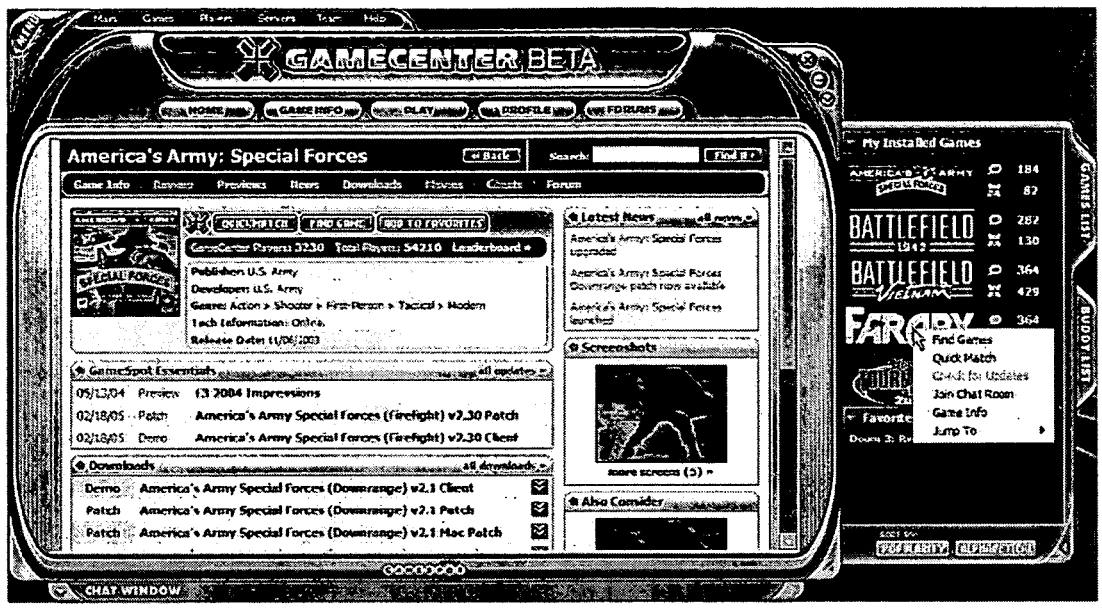

From the Gameslist, it is a matter of only one or two clicks to either game info or gameplay features, respectively (FIG. 14). More advanced features are available in a right-click menu (FIG. 15).

Figure 16:
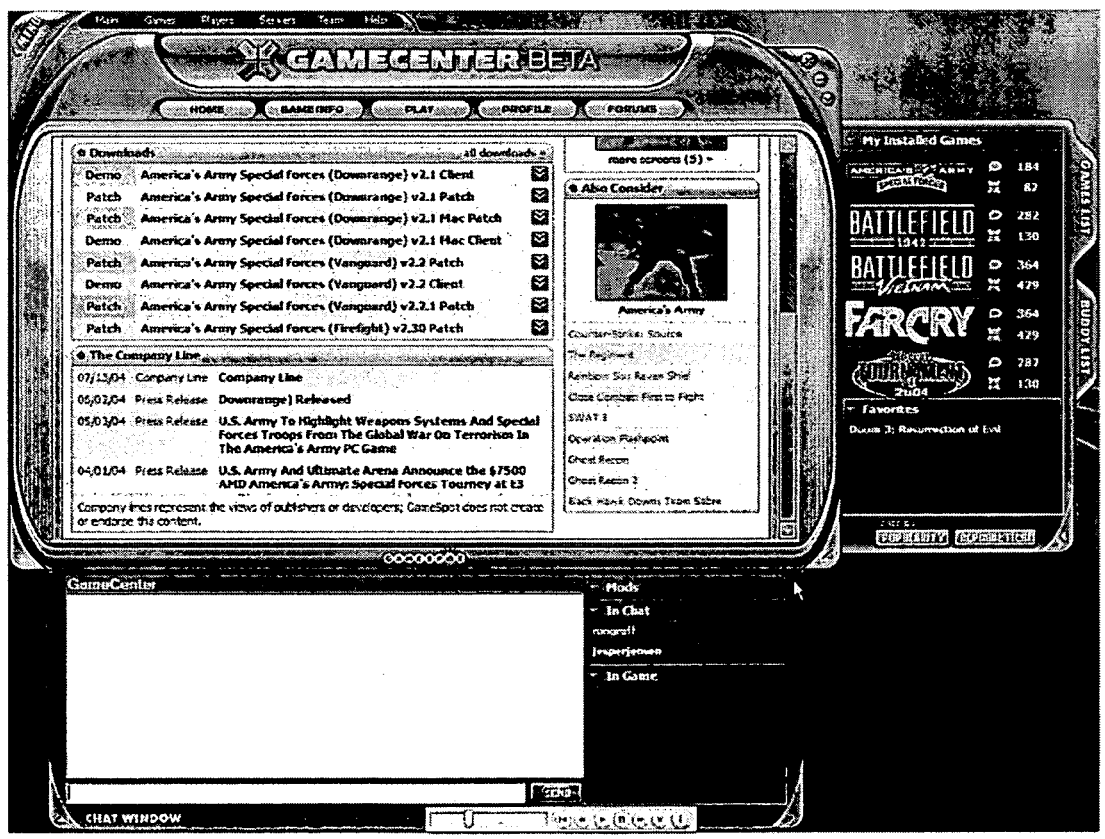
Figure 17:
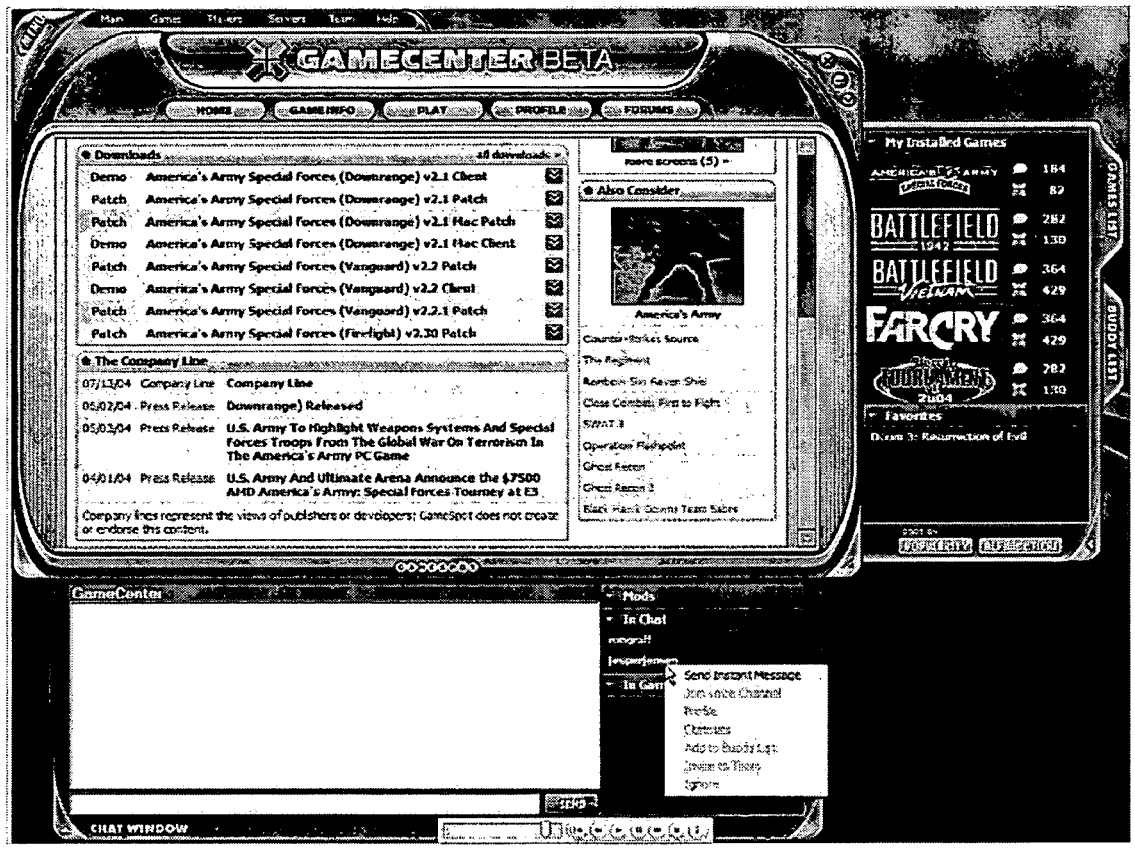
Figure 52:
Figure 53:
Figure 54:
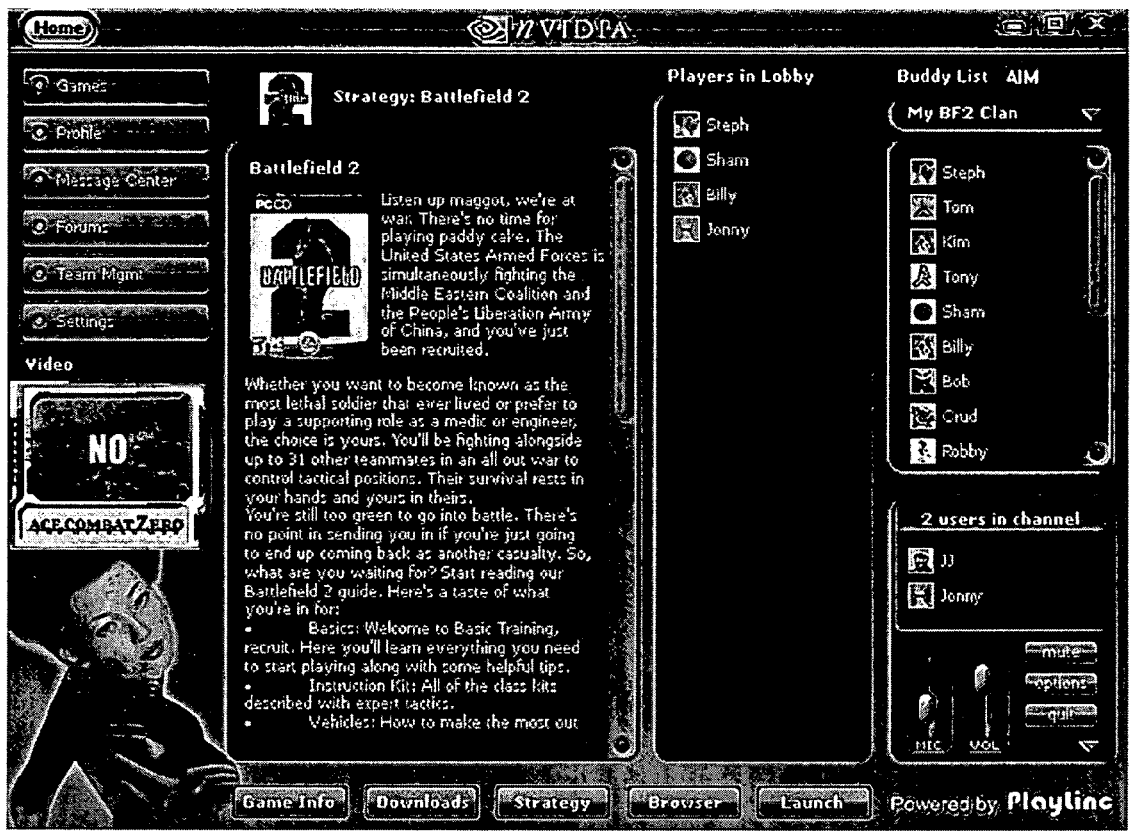
Figure 55:
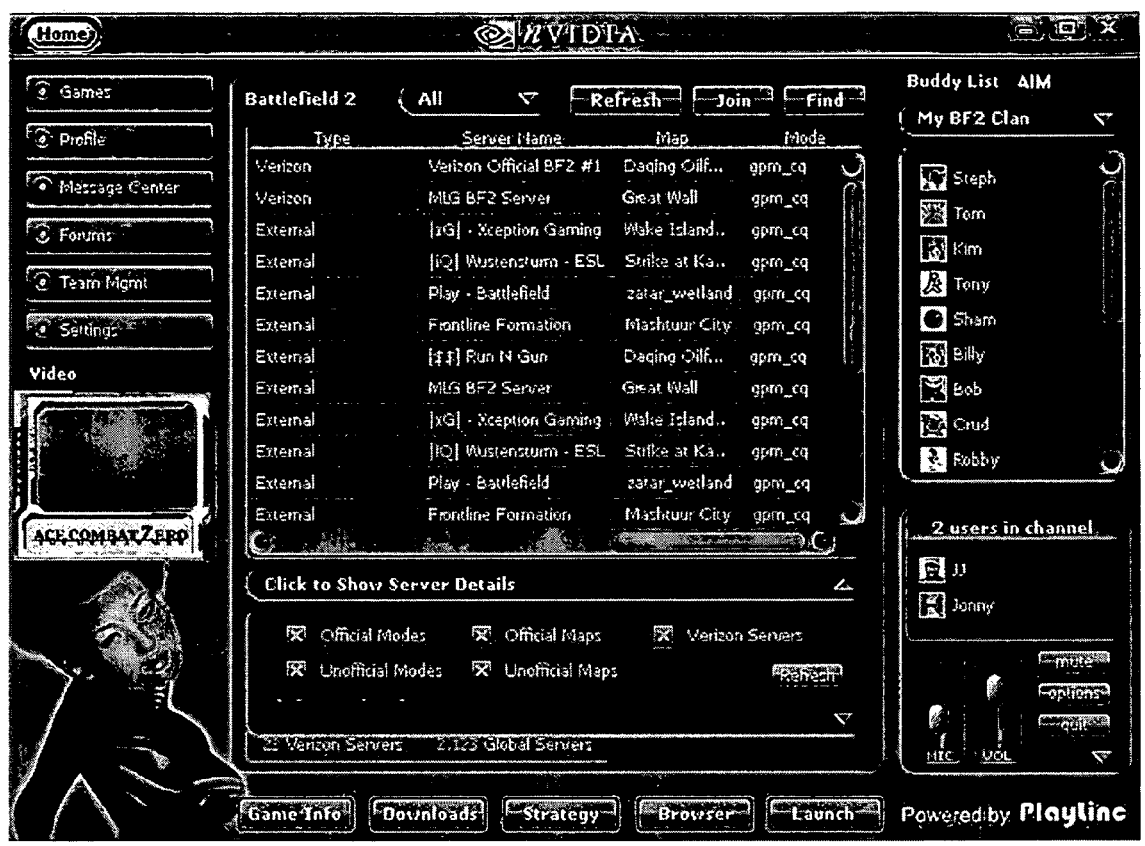

Chat (FIGS. 16-17, and 52)

Before jumping into a game, the exemplary system and method allows the gamer to see who they'll be playing with by entering a general chat channel or a chat channel provided for each game (FIGS. 16 and 52). Chat is fully multiplexed and is integrated with the gameplay component so that players can chat before and after gameplay. Additionally, once the gamer meets other players in the chat channel, they can use a right-click menu to invite them to a private instant messaging session, to join their buddy list or a number of other features (FIG. 17).

Figure 18:
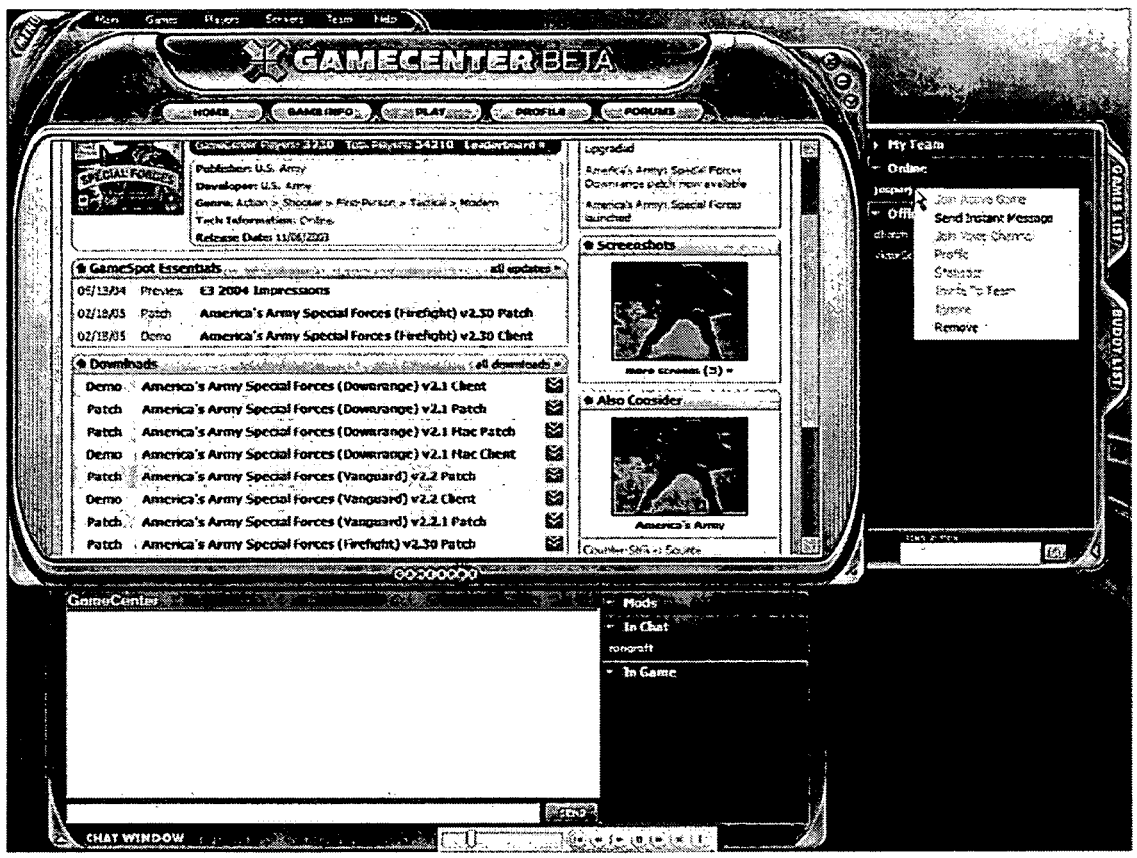
Figure 19:
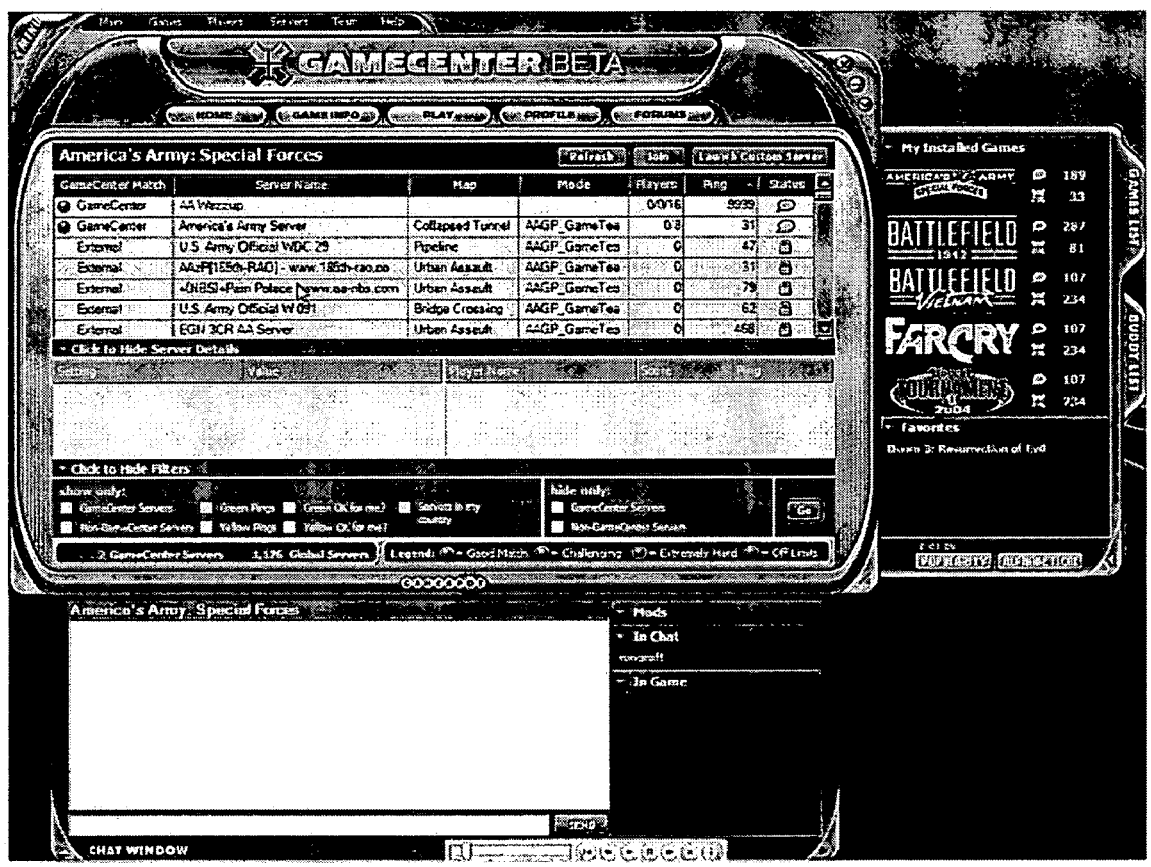
Figure 45:
Figure 46:
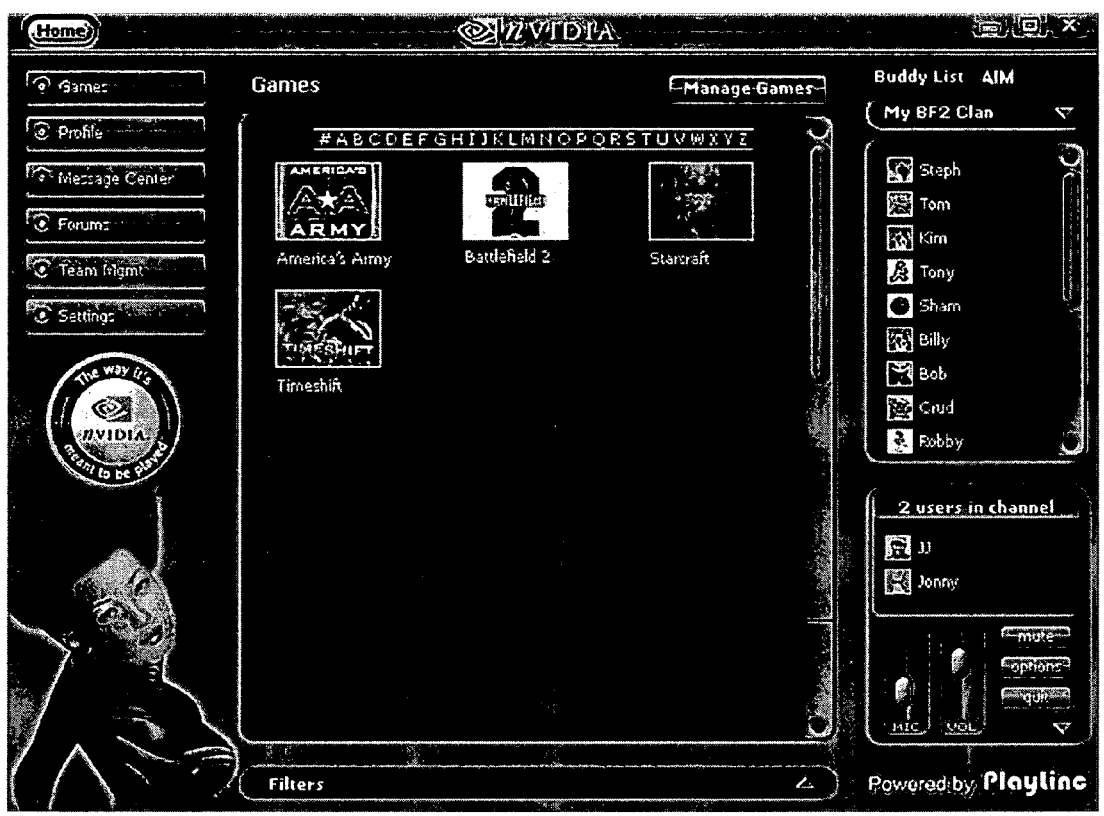
Figure 47:
Figure 48:
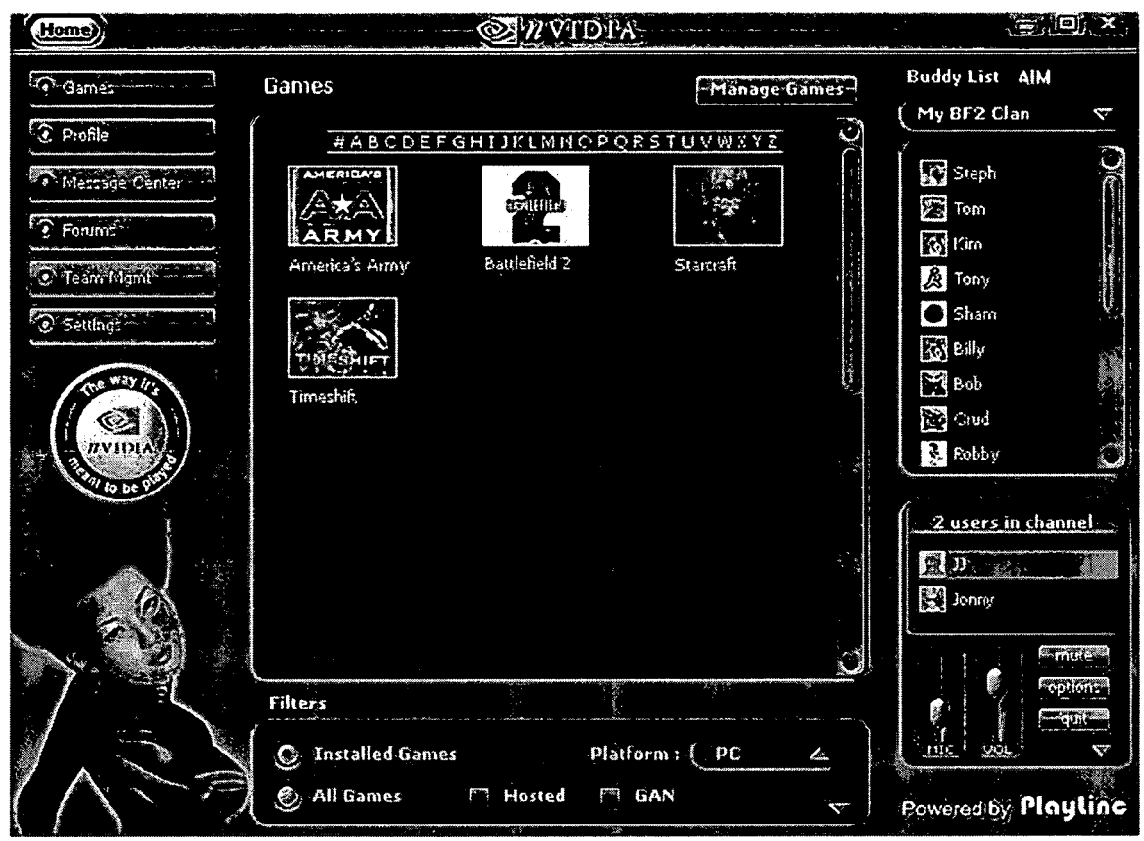
Figure 49:
Figure 50:
Figure 51:
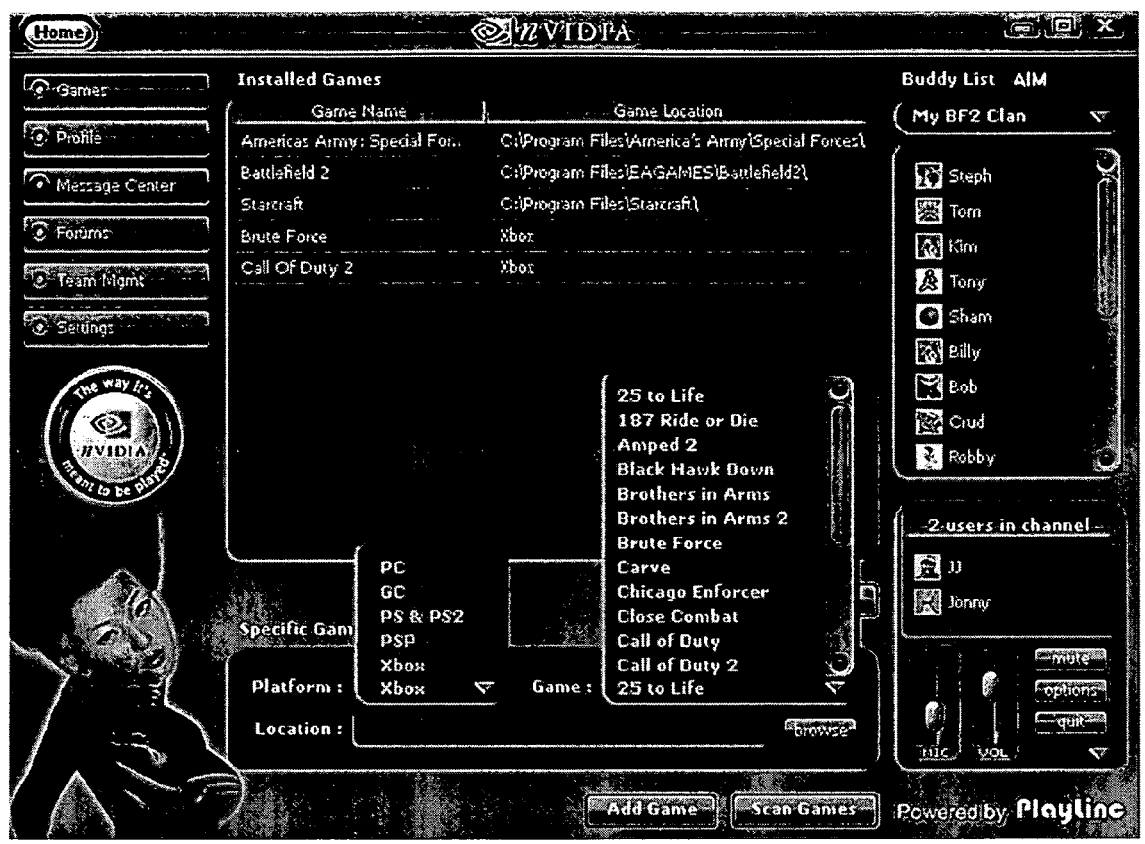

Buddy List (FIGS. 18 and 45)

Once a gamer meets and chats with other players, they can begin to populate their buddy list. The exemplary system and method provides full buddy list management. From the buddy list, the user can, through a right-click menu, follow a buddy into an active game, open an instant message session, open a voice channel, look at the buddy's profile and statistics, invite their buddy to join the gamer's team, and the like.

The exemplary system and method also provides necessary tools for team management, including a dedicated group within the buddy list for team members. The exemplary system and method also provides full featured multiplexed voice support. While typing with active gamers in either a chat channel or in instant messaging sessions is one way to connect, sometimes it is preferable to communicate hands-free. While the exemplary system and method's voice support is primarily intended for in-game communication, it is also available for peer-to-peer, team conferences or for users of the exemplary system and method to talk to each other, even when they are playing proprietary games, like subscriber MMORPGs that may not be supported inside of the exemplary system and method. Advantageously, on-game menus are still available nonetheless.

Gameplay (FIGS. 19-21 and 55-57)

Figure 20:
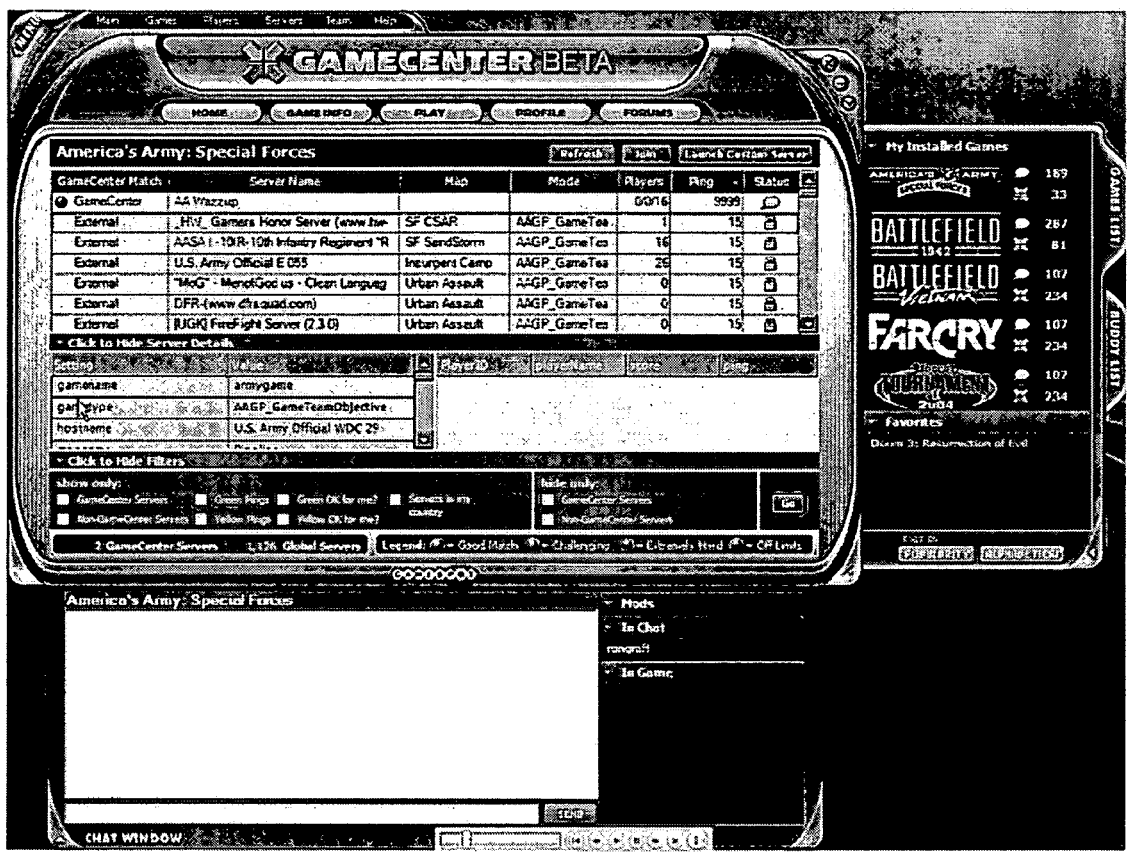
Figure 56:
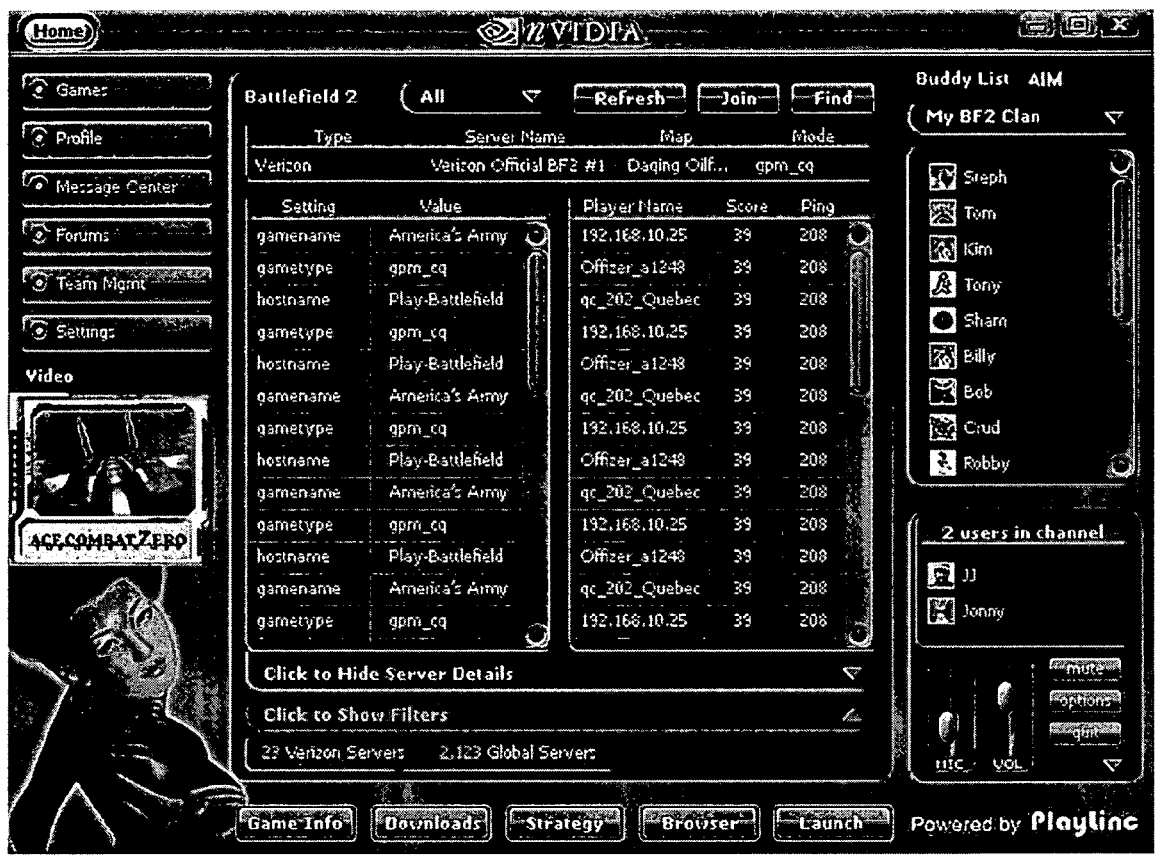
Figure 57:
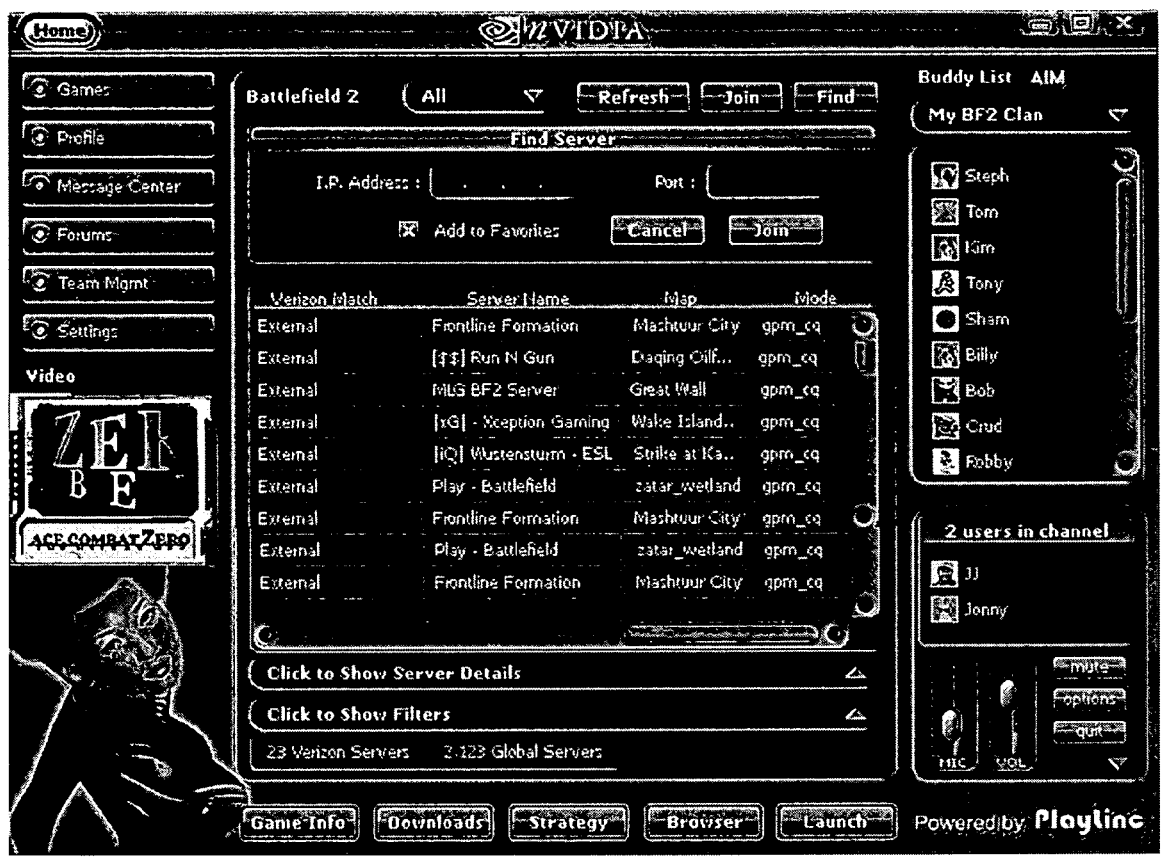
Figure 58:
Figure 59:
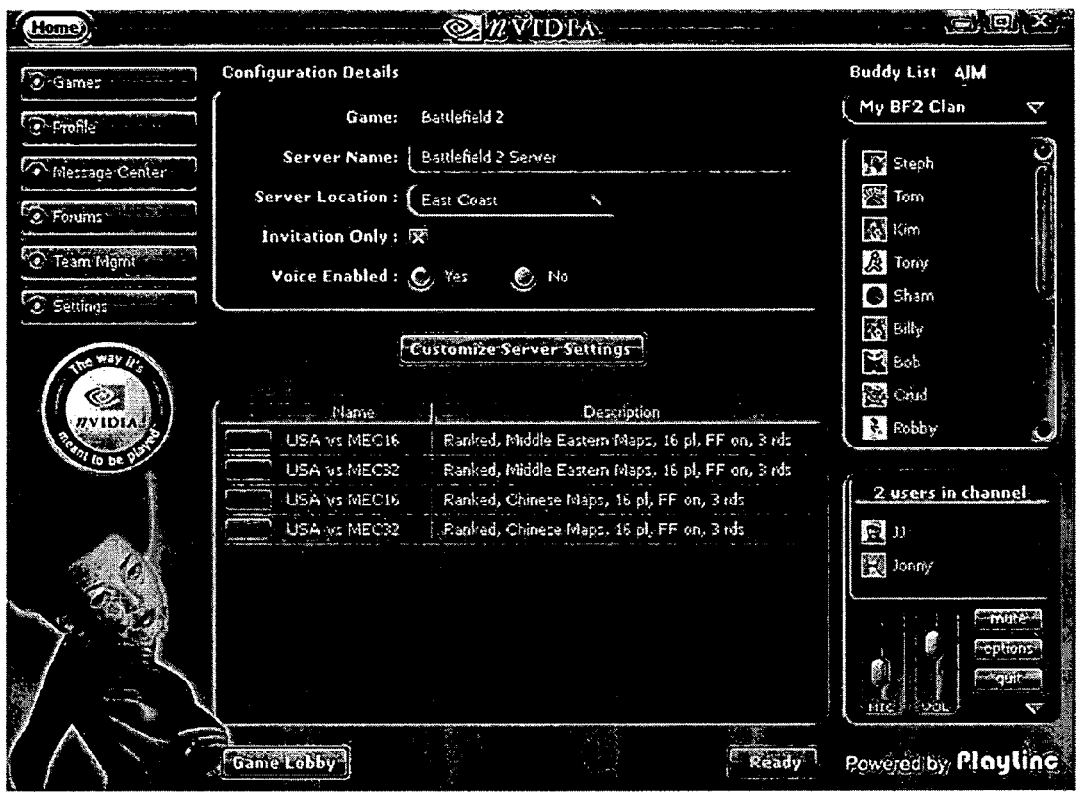
Figure 60:

With the gameplay component of the exemplary system and method, a double click on an installed game from the gameslist takes the gamer to the masterbrowser and information section for that game (FIGS. 19 and 55-57). The masterbrowser of the exemplary system and method can provide the same type of information and functionality as game specific or third party masterbrowsers. The masterbrowser for any particular game can show the games currently running inside of the exemplary system and method backend, as well as 1,000's of external servers across the Internet. The masterbrowser also can provide more specific information on any server the gamer is interested in (FIGS. 20 and 56).

For example, when entering the masterbrowser for America's Army, the gamer also is placed in the chat channel specific to America's Army. The America's Army servers running inside of the exemplary system and method are at the top of the masterbrowser and that they reflect a "skill level" like the levels in a single player game, the exemplary system and method captures the gameplay skill and experience of players in-game and maintains an increasing or decreasing skill level for that particular player, based on how well and how often that they play the game online, advantageously, breeding extreme brand loyalty.

Because the exemplary system and method knows who each of the registered users is, and what they do after they log into the exemplary system and method, the exemplary system and method is able to capture their online gameplay experience and provide an experience level for all registered users of the exemplary system and method in all games that they play. Therefore, when a registered user of the exemplary system and method brings up the masterbrowser for any supported game, the exemplary system and method can judge, based on the players experience in that game versus the average aggregate experience of the players already in that game server, where the user is most likely to have a positive competitive experience.

Although the exemplary system and method is suitable for first person shooter games, like America's Army, because of their popularity, the genre and platforms of the games supported by the exemplary system and method can include sports, simulations, RPG, RTS, MMORPG, Console based games and the like. Advantageously, the exemplary system and method can support such a positive game player experience across all supported game titles and game types and platforms (e.g., PSP, PS2, PS3, XBOX, XBOX360, Nintendo GameCube, PC, etc.)

Figure 21:
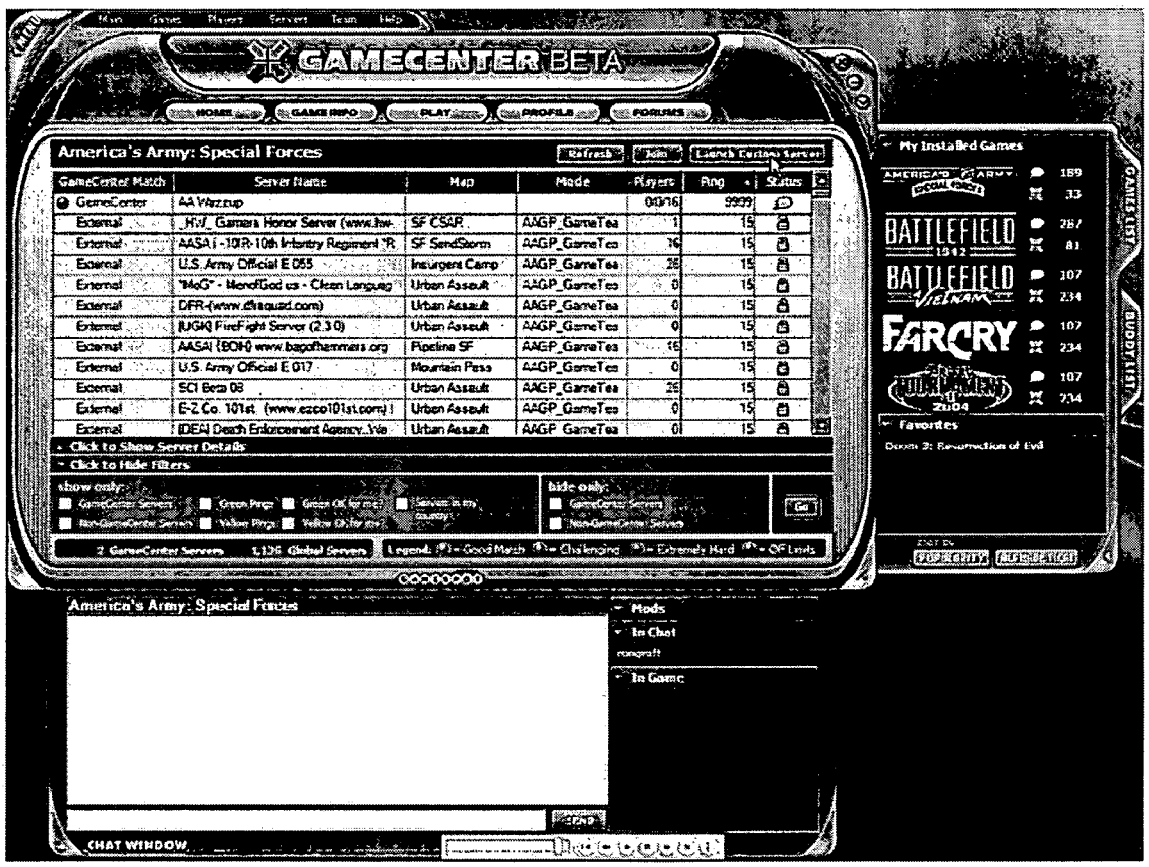
Figure 22:
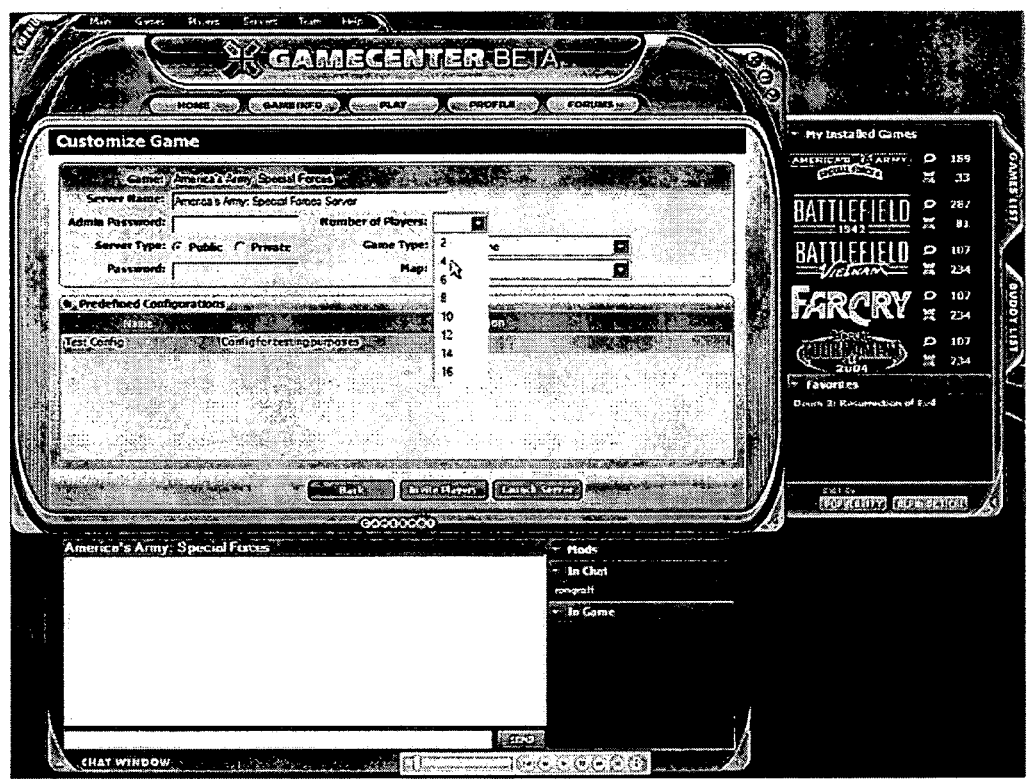
Figure 23:
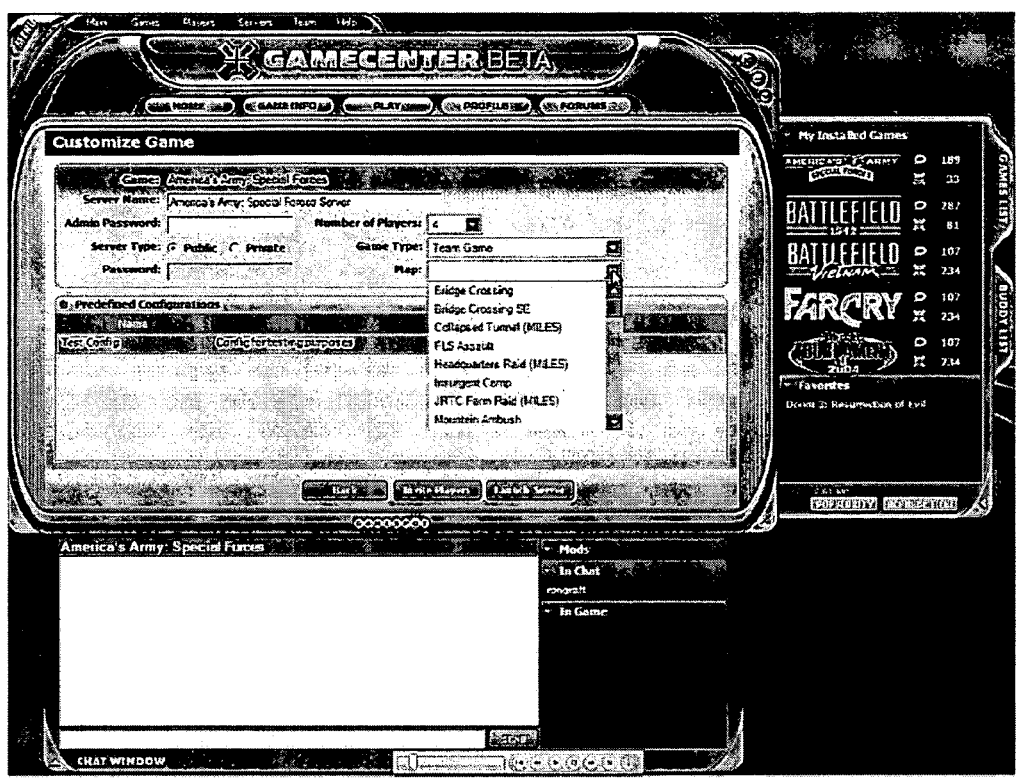
Figure 24:
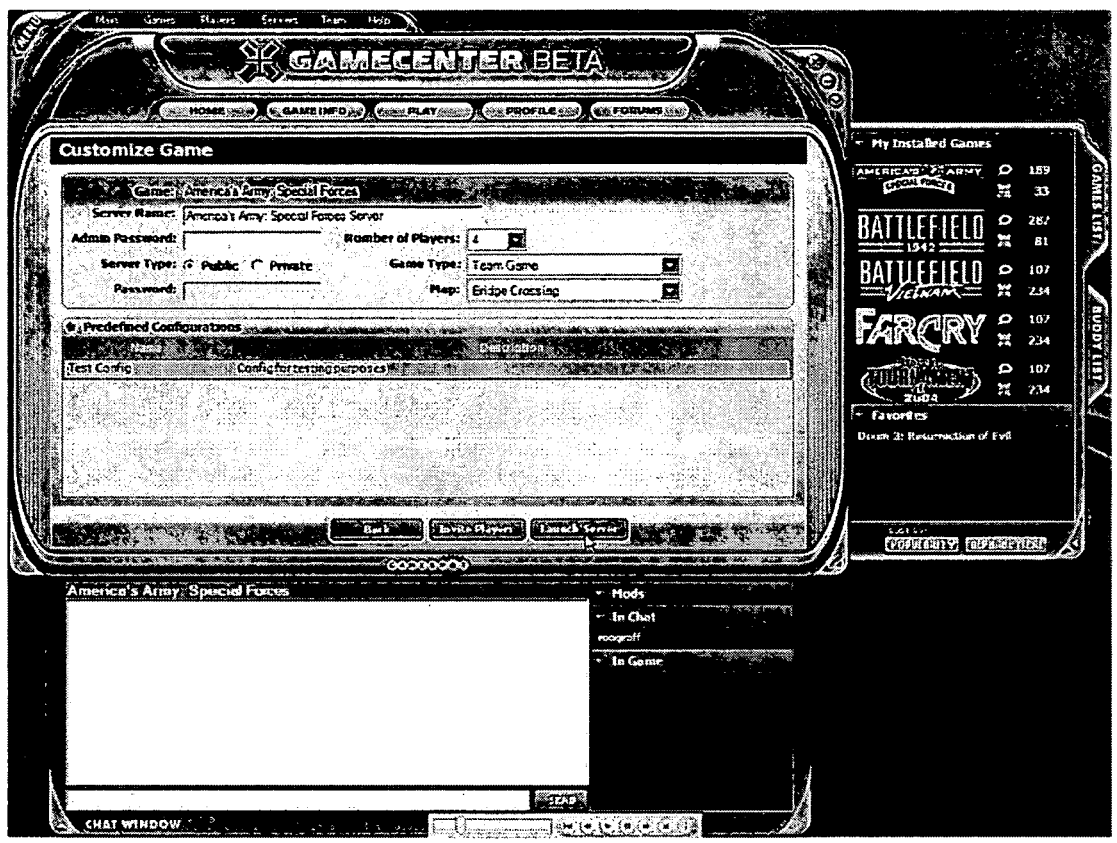
Figure 25:
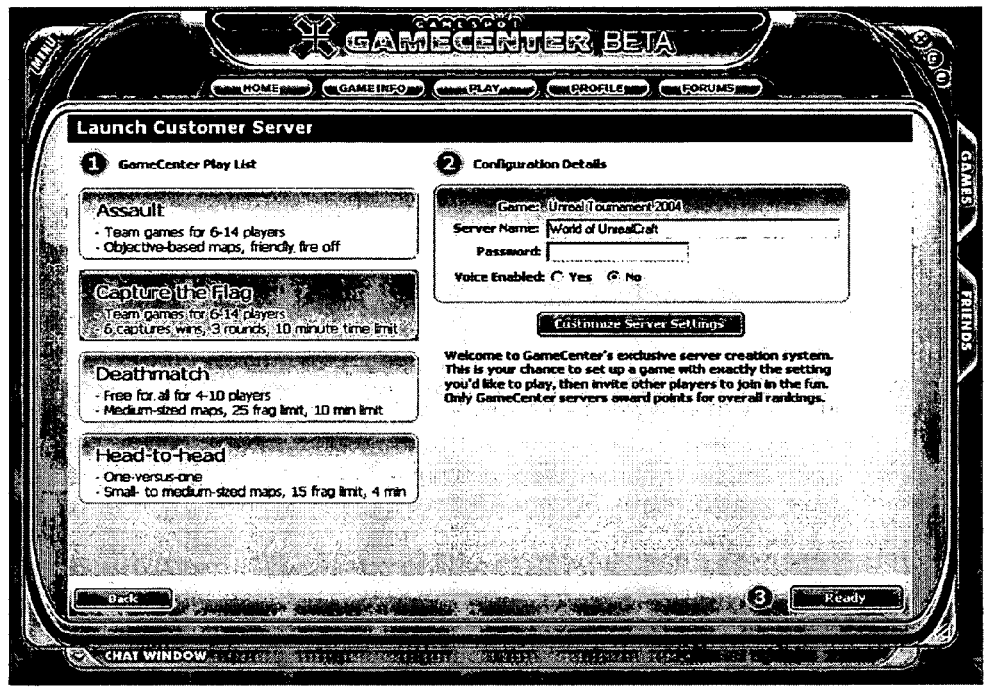
Figure 26:
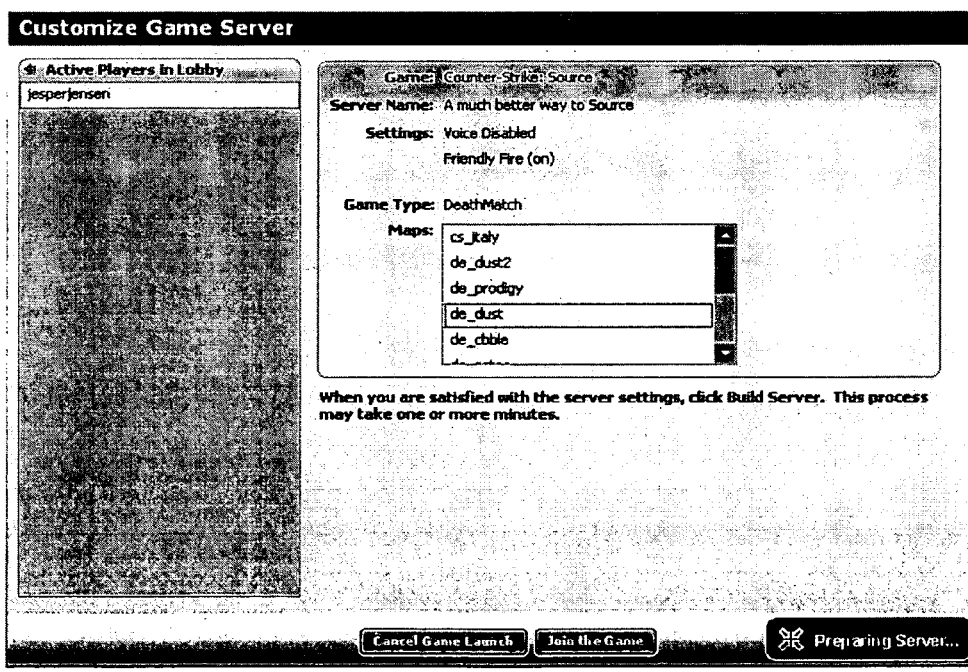
Figure 27:
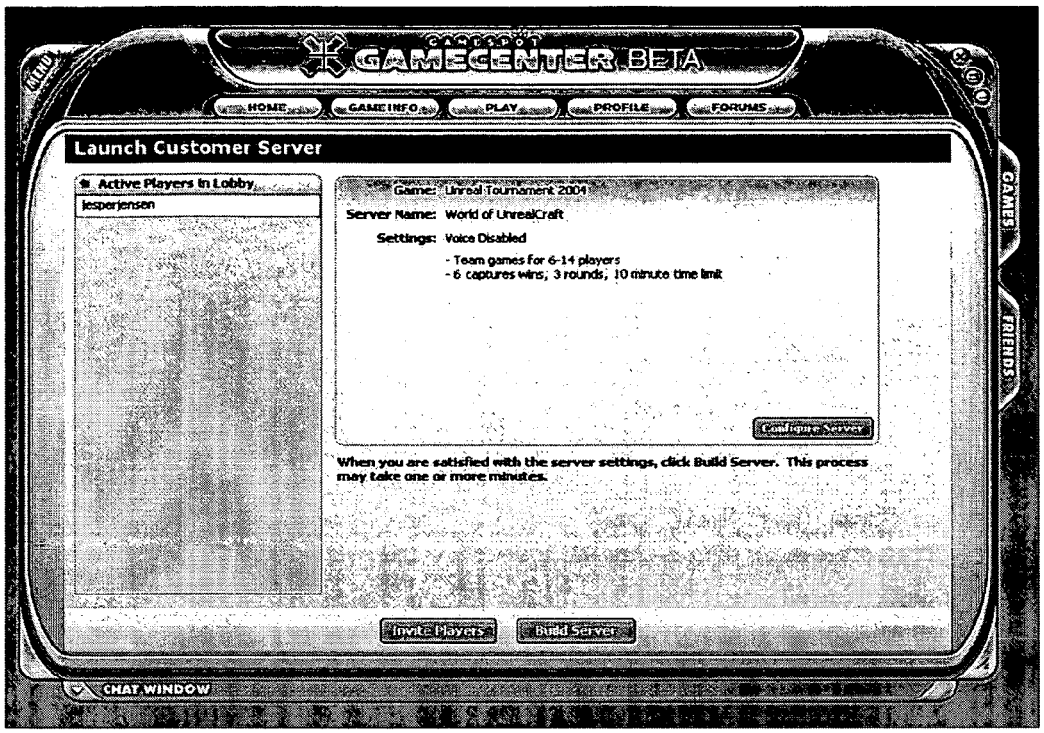
Figure 28:
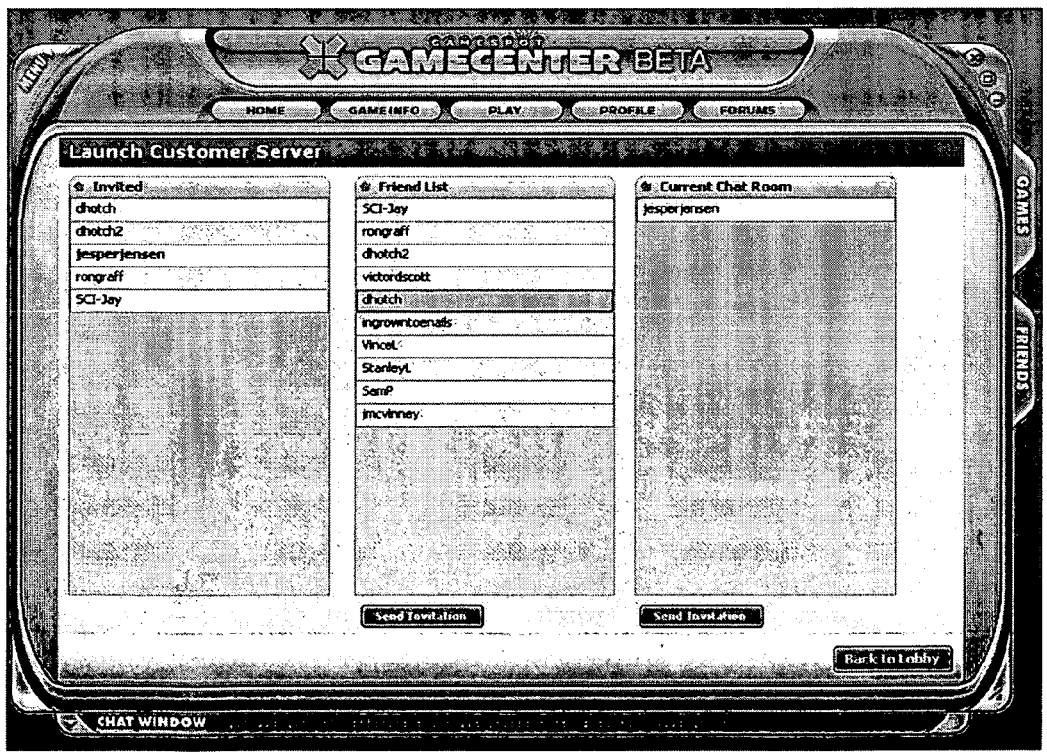

The user of the exemplary system and method can enter any of the games in the masterbrowser or they can dynamically start their own game server, customizing it to their own specifications and, even inviting others to play with them if they so choose (FIG. 21).

It is this technology of the exemplary system and method that most easily separates the gameplay inside of the exemplary system and method from any other available online. It is also this technology, and its resultant highly efficient use of the exemplary system and method's powerful game servers that allows the exemplary system and method to offer such a turnkey product for free and its premium services at a monthly subscription price point that can be very attractive to distribution partners.

Launch Server (FIGS. 22-19 and 58-66)

As the gamer begins to launch their custom server, they can choose from a number of pre-configured settings, choose one that they have previously set up and saved, set up all new configurations, and the like (FIGS. 22-23, 58-60 and 63-64). After the map, mode and other settings have been chosen, the user can either launch the server directly or they can invite some of their friends into the game at the same time (FIGS. 24-26, 61 and 64).

Dragging players from the buddy list allows the gamer to place them on one team or the other. As the gamer invites his friends (FIGS. 27-28, 61 and 64), they receive a bubbleup message that they have been invited to the lobby to launch a game.

Figure 29:
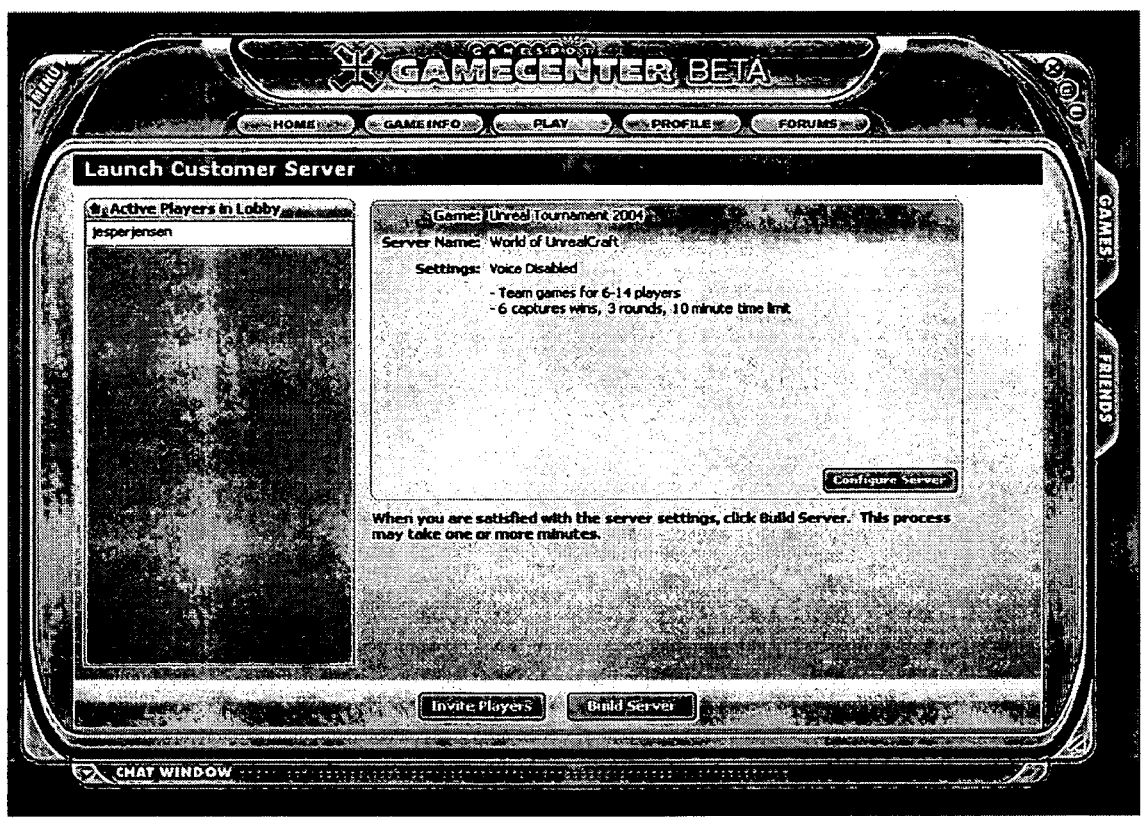
Figure 61:
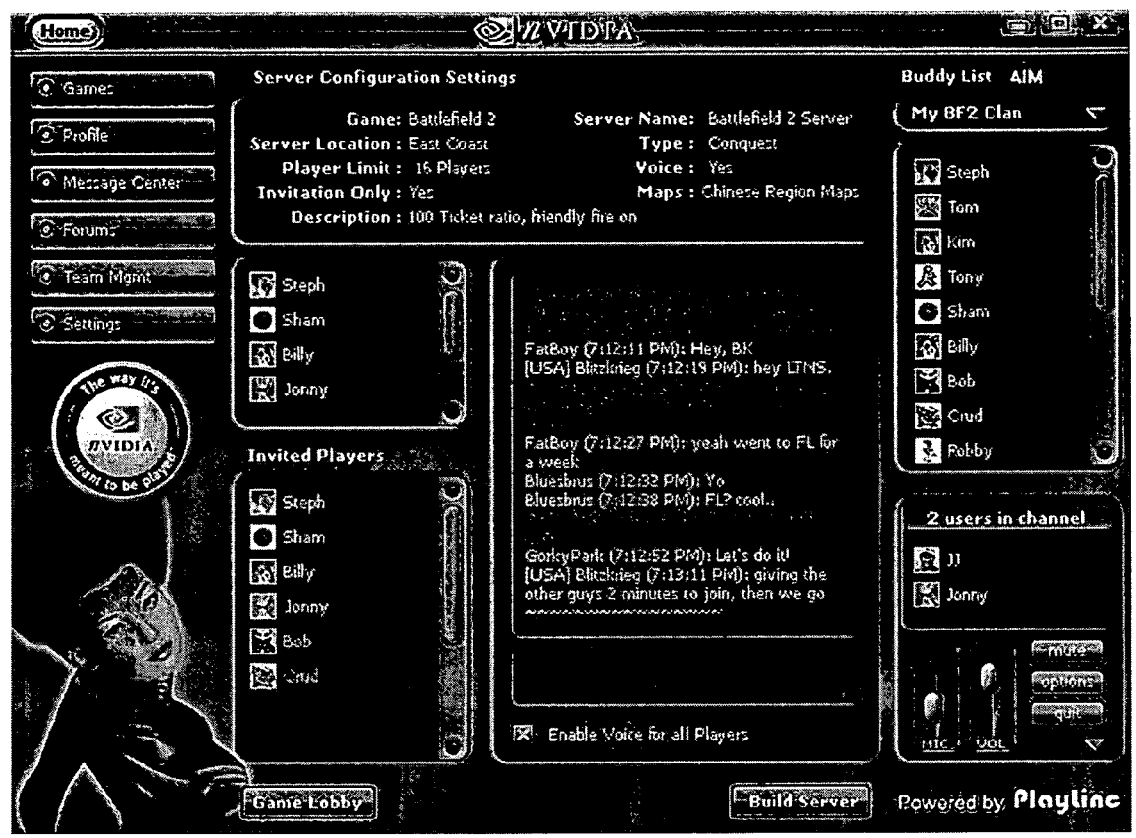
Figure 62:
Figure 63:
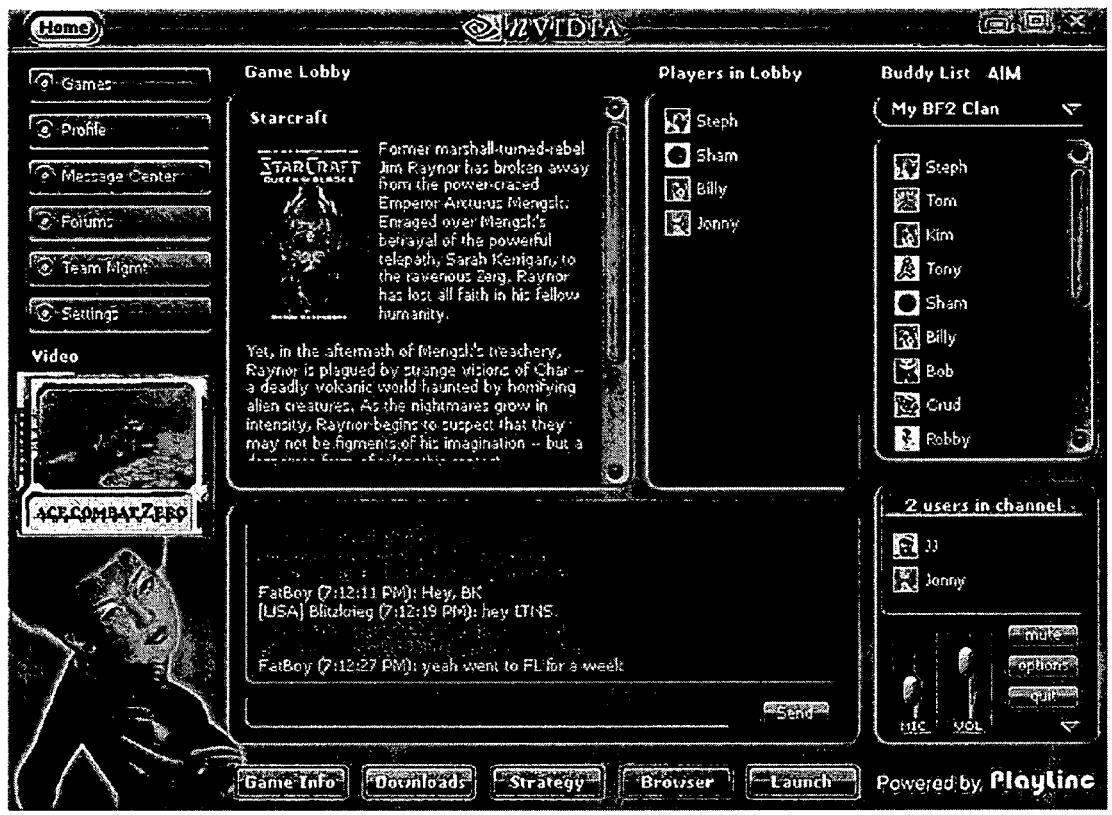
Figure 64:
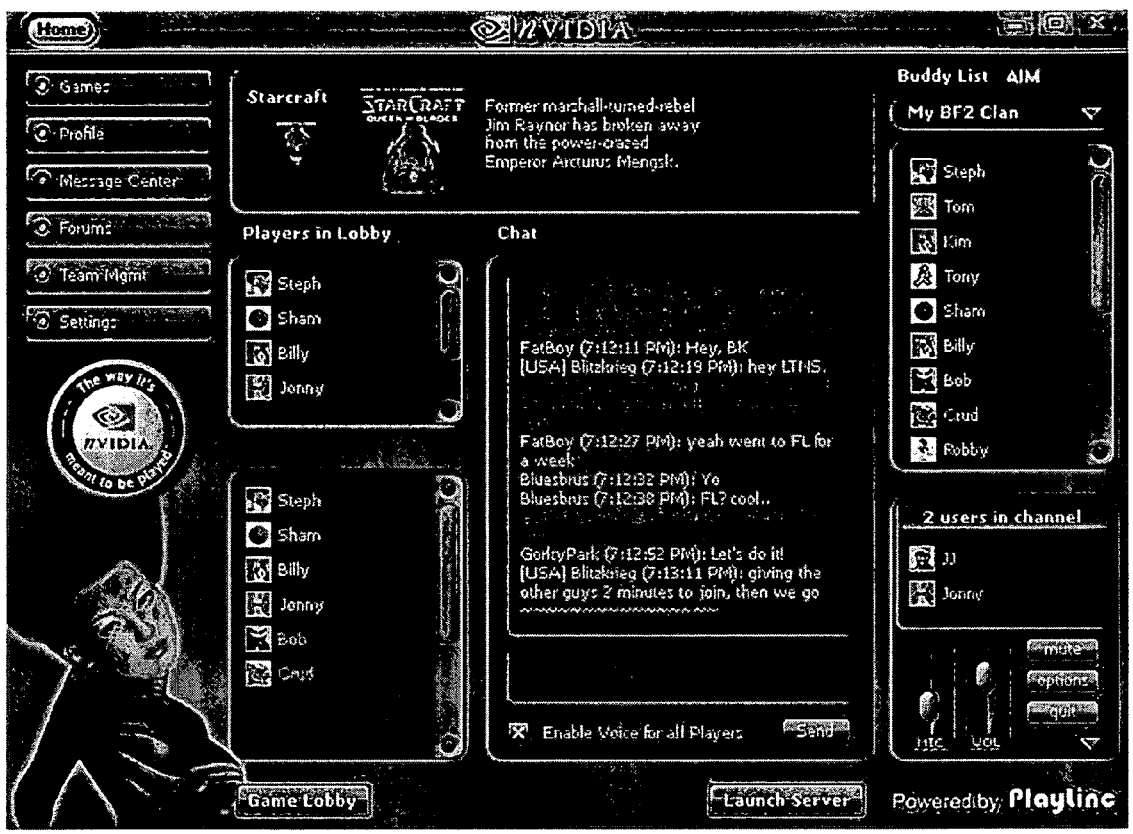
Figure 65:
Figure 66:

As they accept, the gamer will be able to tell on the launch screen that they have accepted (FIGS. 29, 61 and 64). Once several of the players have accepted, the gamer can start the launch countdown. That includes either building the high-speed server the user has chosen on backend servers of the exemplary system and method (FIGS. 58 and 62), or establishing a LAN like interlink (FIGS. 64-65) that allows for peer-to-peer game-play virtually over the internet from the users own machine.

After the hosted high-speed server has been built (FIG. 62) or the Game Area Network (GAN) has been initiated (FIG. 65), all of the players that have accepted the invitation to play can see the same countdown screen (FIG. 66), and at the end of the countdown all of the players can be drawn into the game at the same time. At the same time that the players are drawn into the game, they are also dropped into a voice or multiple voice channels, as controlled by the player launching the game, providing for automatic in-game voice capability for any supported game. While an invitation and launch feature may have been available on a limited basis for peer-to-peer games, the exemplary system and method for the first time provides such a feature for multi-player online gaming. At the end of the game, the chat and voice channels can remain open so that the players can discuss the game that they have just played, adding to the sense of community in the exemplary system and method.

Figure 78:
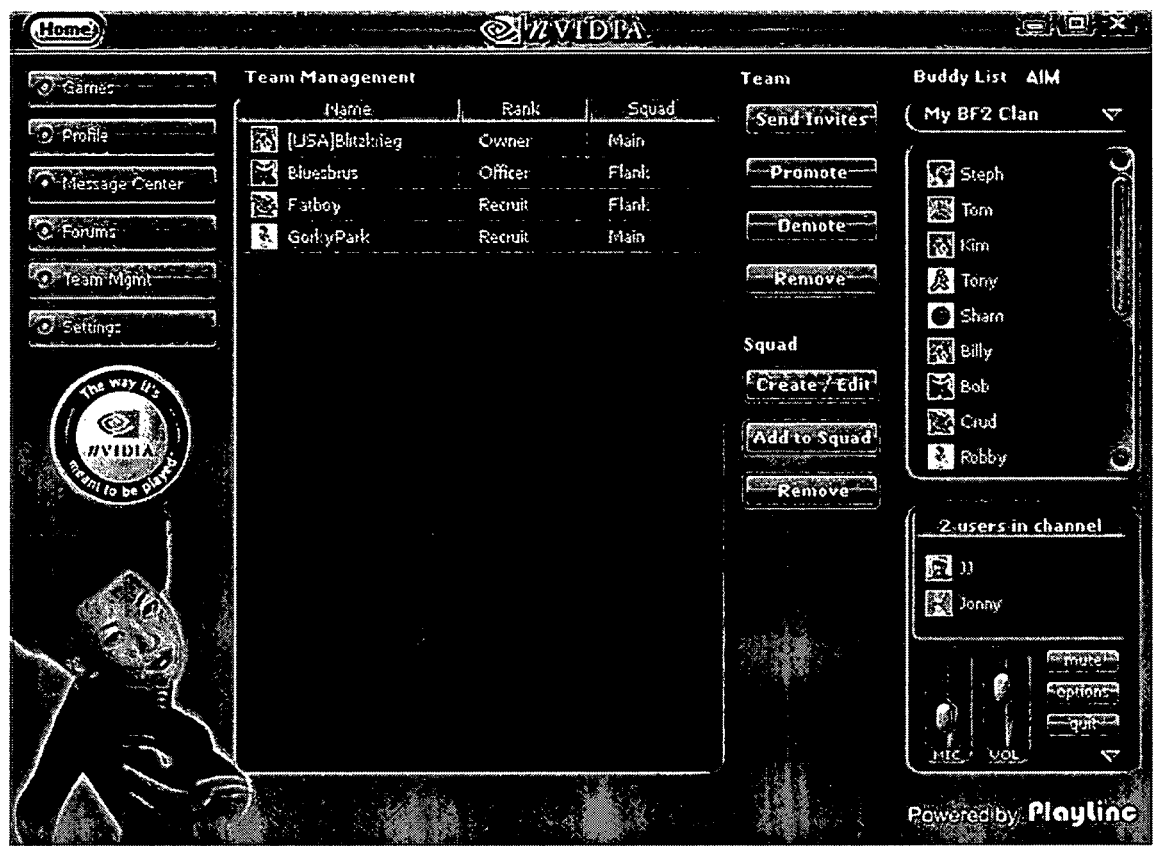
Figure 79:
Figure 80:
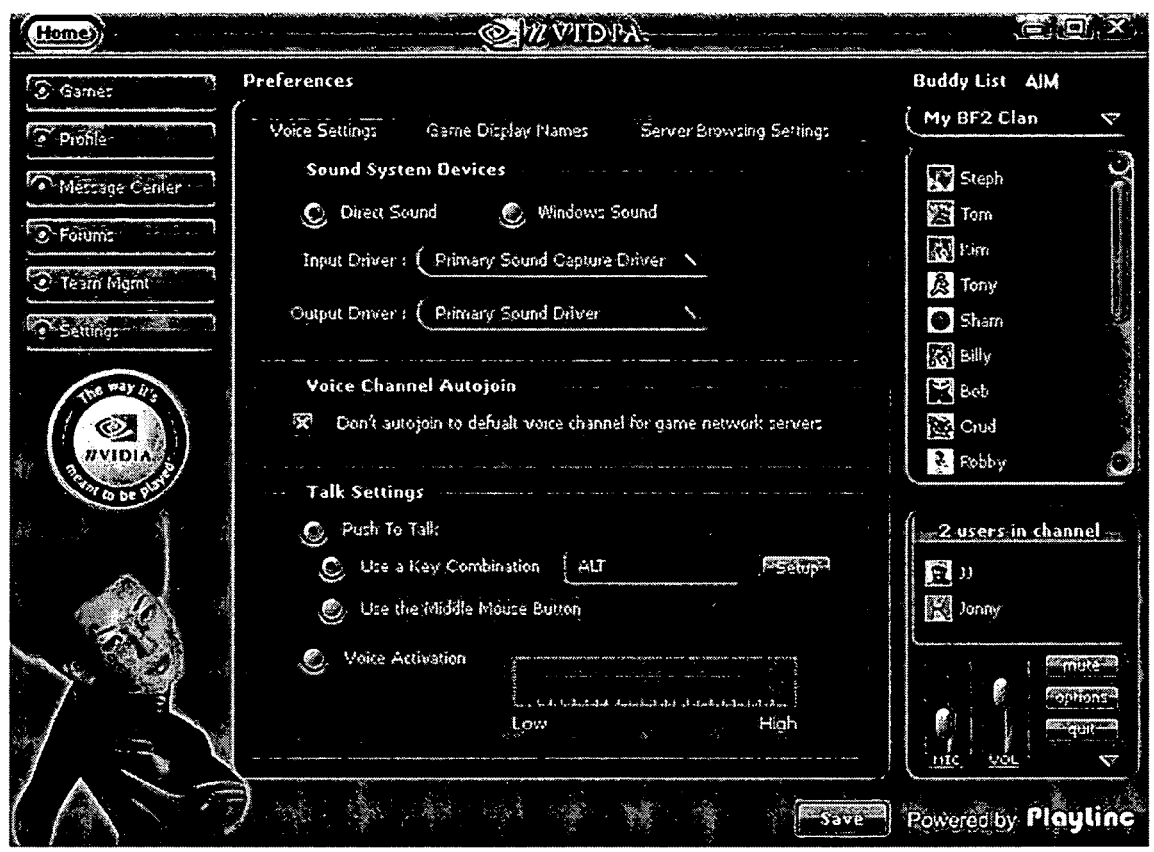
Figure 81:

Profile (FIGS. 30-31 and 72-74) and Team Management (FIGS. 78-79)

Figure 30:
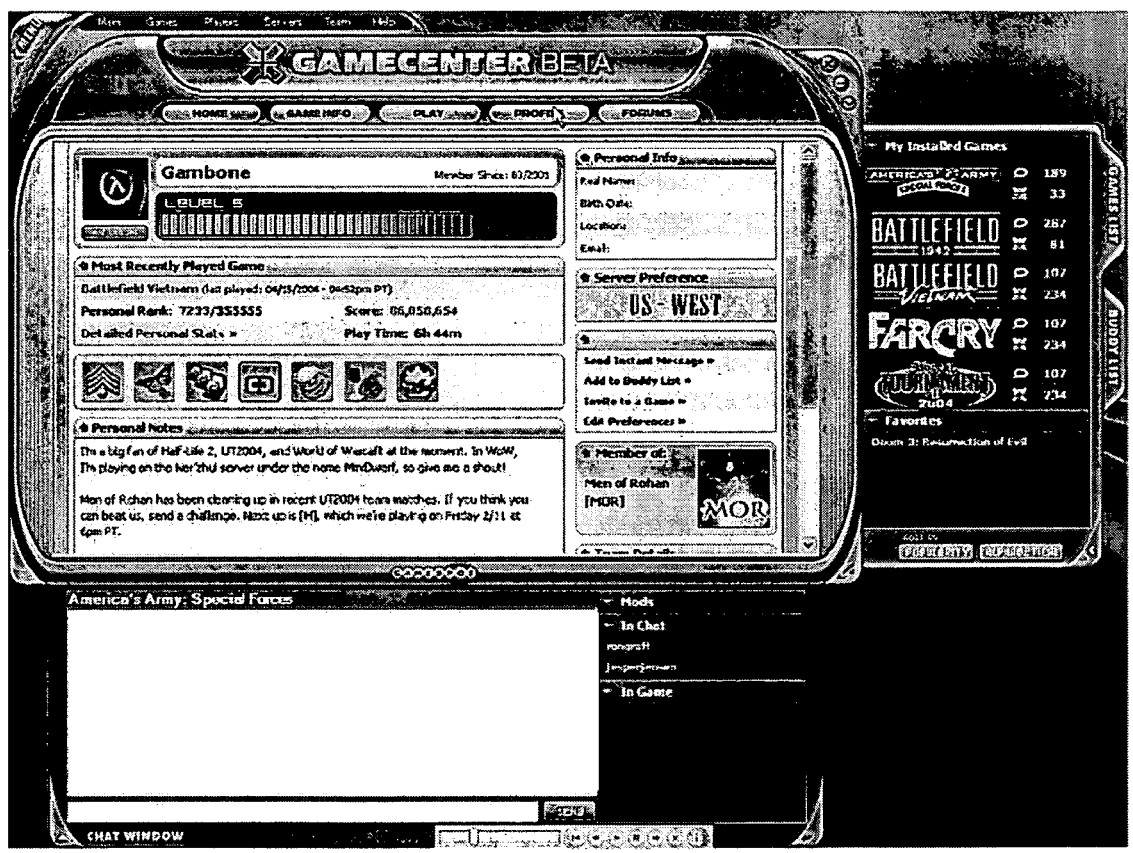

For both individual users and teams, the exemplary system and method can maintain a profile (FIG. 30). The profile allows users and teams to communicate with the other registered users of the exemplary system and method and also allows them to gauge and track their own successes. Players and teams also can establish message boards, collect trophies, provide other customizable information, and the like.

Figure 31:
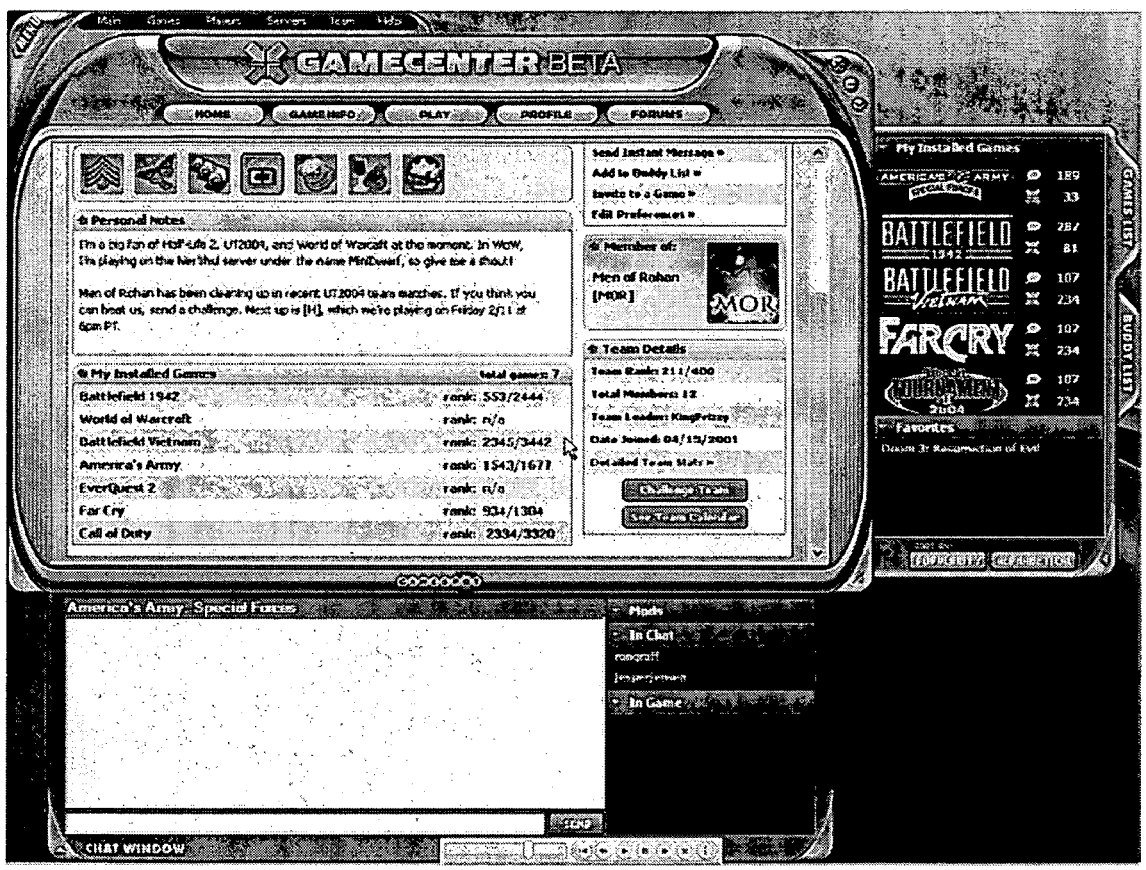

Profiles also can lead into Leaderboards and Tournaments. Again, because the exemplary system and method keeps track of the experience level of players and teams, tournaments can be tailored for any experience level (FIG. 31). The team management Screen (FIGS. 78-79) provides the ability for a user to create teams, clans or guilds on the fly, or become a member of another team by invitations. The Team management screen also allows the user to assign access rights to the members of the team by promoting a member from "Recruit" to "Officer". This gives access to functions like the Team specific forum controls, VoIP administrator controls and the ability to control the high-speed game server controls (e.g., Remote Server Control (RCON), etc.).

Figure 32:
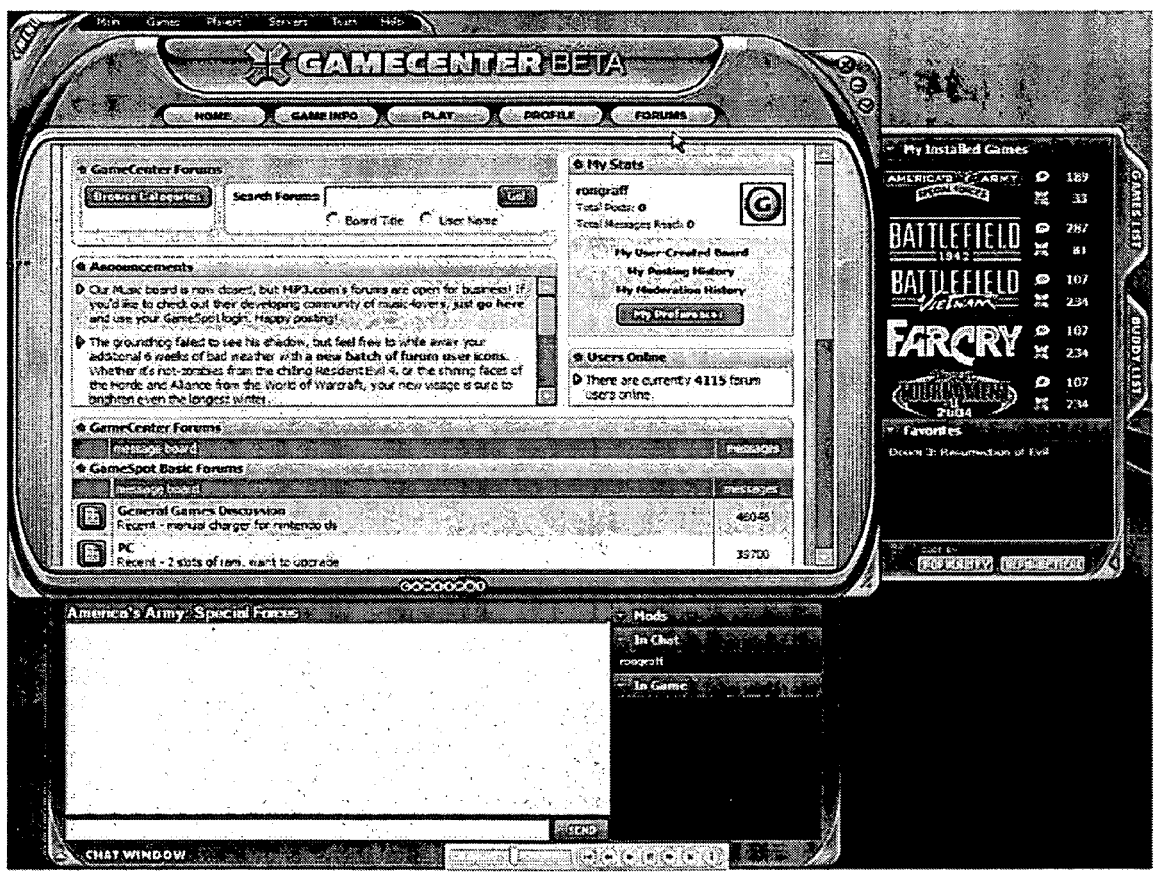
Figure 33:
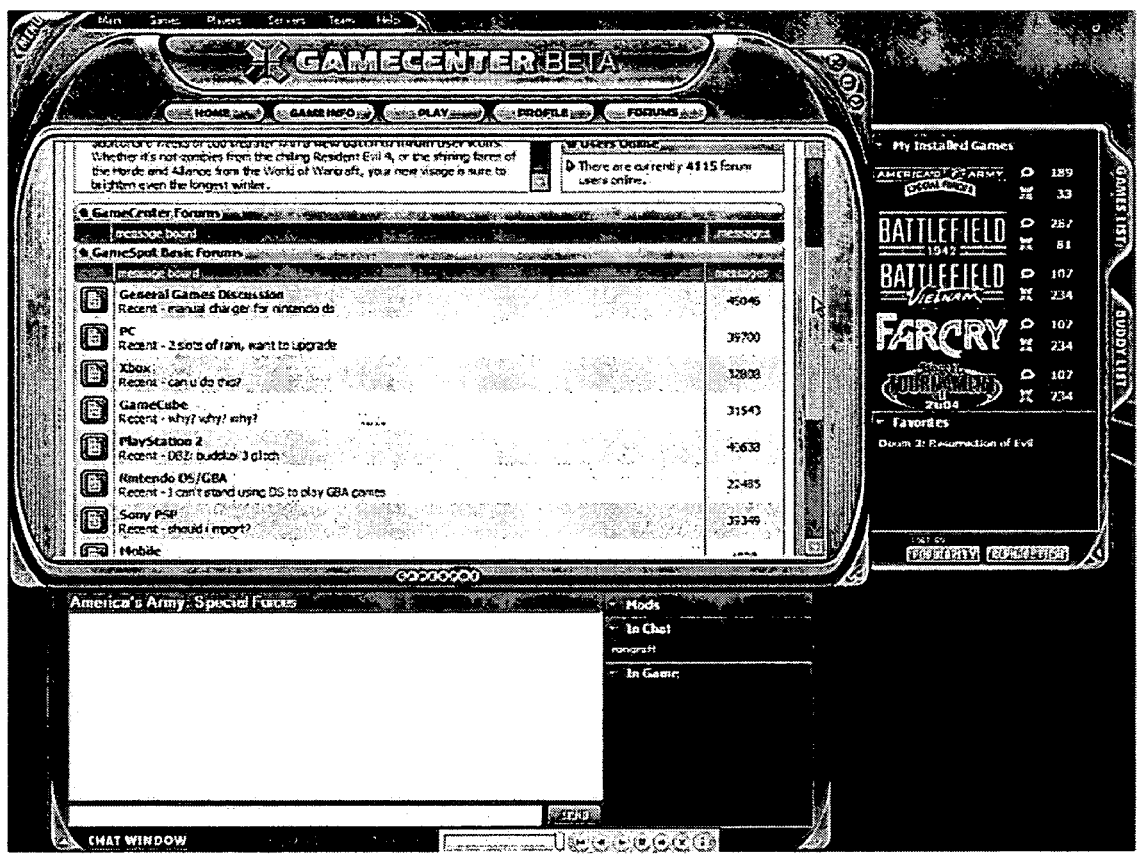
Figure 77:
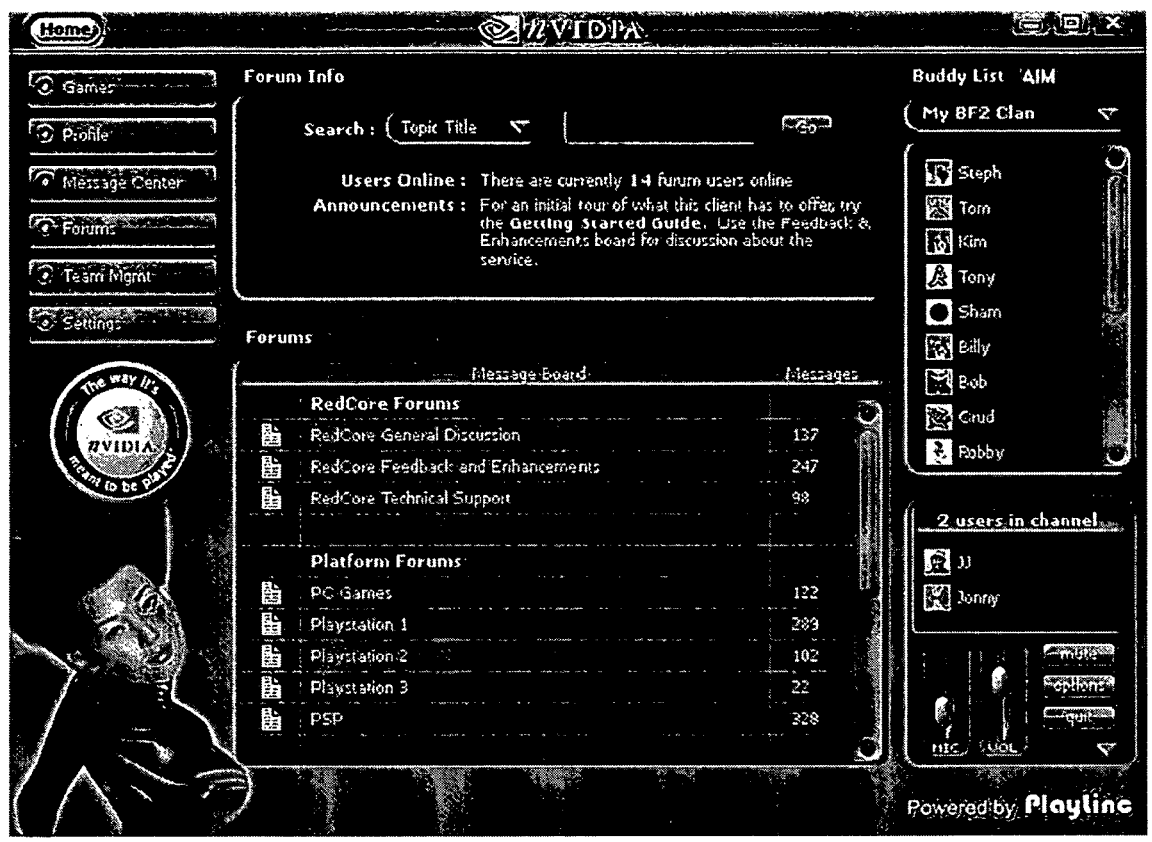

Forums (FIGS. 32-33 and 77)

As a further community feature, the exemplary system and method supports a full message board system (FIGS. 32 and 77, e.g., built on the flexible SCI customized forums engine). Forums can be specific to the exemplary system and method, but any registered user of the exemplary system and method also has access to the broader forums available, for example, at publishers directly (FIG. 33). The Team based forums are for inter-team communication and allows a group (e.g., team, clan or guild, etc.) to keep communication between the members.

Other Features (FIGS. 75-76 and 80-82)

The exemplary system and method includes further features, including a message center (FIGS. 75-76), and application stetting for voice (FIG. 80), game display names (FIG. 81), server browser settings (FIG. 82), and the like.

The Orion Framework of the Exemplary System and Method (FIGS. 34-40 and 67-71)

Figure 39:
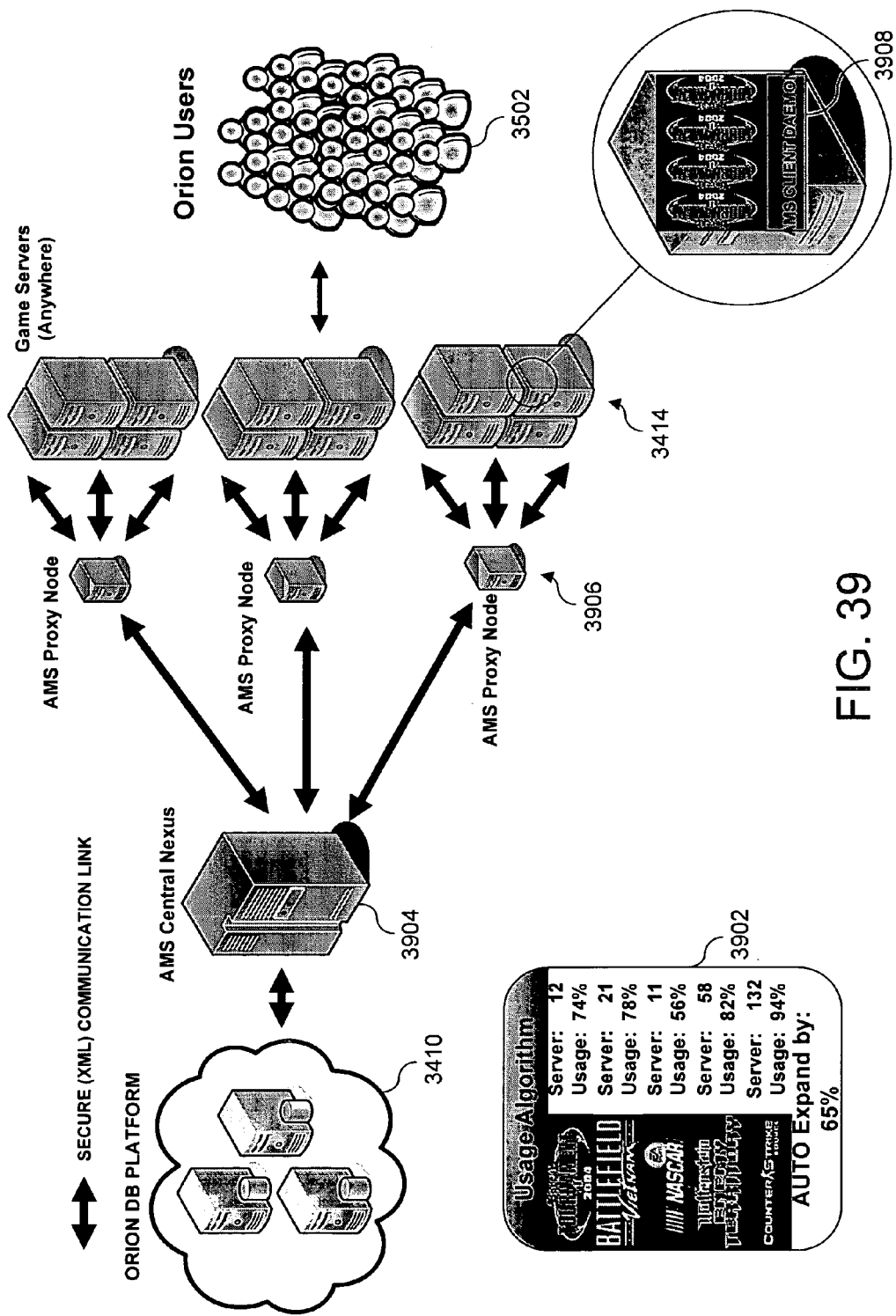

The exemplary system and method framework can be included as part of the backend and can include:
 a central repository master browser system (FIG. 34);
 an experience calibrated match-making service (FIGS. 35-38);
 a dynamic multiplayer server component auto deployment and aggregation system (FIG. 39, e.g., self created servers on the fly);

a lobby centric simultaneous and collaborative client game play launching feature working across all suitable multi-player games (FIG. 40); and a video game screen over-layer technology or "On-game Menu System" giving users access to a variety of control interfaces while inside the video game (FIGS. 67-71), and the like.

The exemplary system and method framework puts several technologies in hands of gamers to get into the best game for them and gets them into it faster. By contrast, background art systems include:

mesh querying systems with every user scanning all systems to get information;

random matching systems based on time and distance (e.g., ping or latency);

static servers controlled by provider or complicated direct server access to setup and launch dedicated or similar servers; and in game match system with peer-to-peer play.

However, the exemplary system and method framework is much more advanced and works across all suitable games. Advantageously, the exemplary system and method framework brings several advancements to online game play by allowing users to interact with each other on all points of the game play on an integrated platform, instead of having to coble together various $3^{rd}$ party solutions that are often incompatible.

Figure 34:
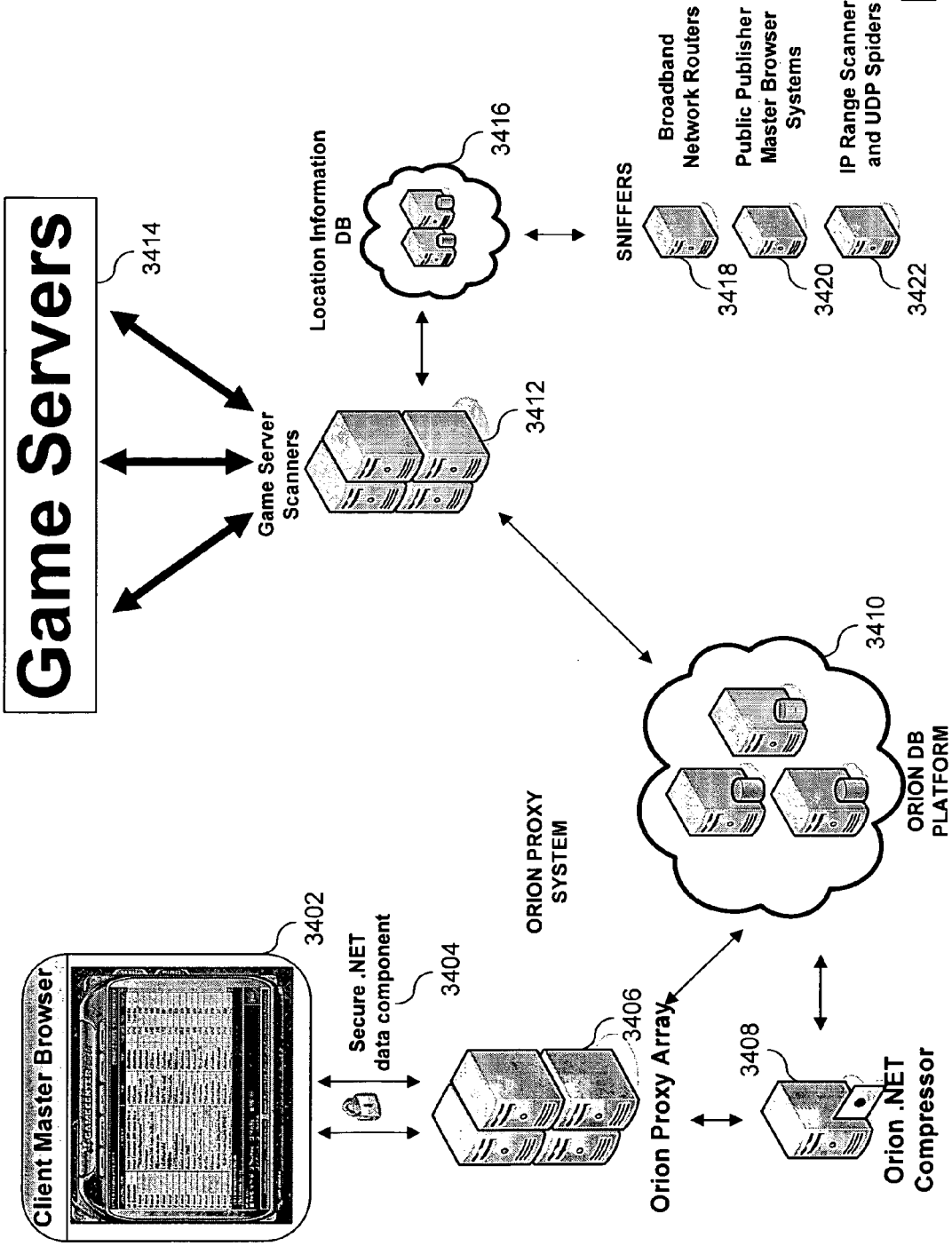

Central Repository Master Browser System
(FIG. 34)

Client Master Browser Screen 3402

The client master browser screen 3402 can be configured as grid that shows information about game-servers 3414 both inside and outside of the exemplary system and method framework. From the master browser 3402 the end-user can access servers 3414 upon viewing current information about the chosen server (e.g., whether dedicated or not).

Secure .NET and C++ Data Components 3404

The secure C++ and .NET component 3404 can be configured as a highly pre-compiled compact binary file that includes information relevant to the chosen game type. The .NET component 3404 can be optimized to display the requested data at speeds, for example, up to 125 times faster than other master browser systems.

The Proxy System

Proxy Array 3406

The proxy array 3406 can be configured as front line servers for directing traffic from a .NET or C++ (QT) based client. The proxy array 3406 can be configured for handling massive amounts of traffic based on the direct support of hardware platforms (e.g., SSL load balancers, SSL accelerators, and the like). The proxy array 3406 can serve as an interface for the outside world to share data with—in essence the doorway to Orion.

C++ and .NET Compressor 3408

The .NET or C++ Binary compressor 3408 can include a set of units for making the correct data-base calls and compressing the XML stream to an ADO or binary object ready for the Orion proxy array 3406 to use for the component 3404 transmission. The component 3404 can be stored in memory for delivery and is updated, for example, every 2-5 min.

DB Platform 3410

The database (DB) platform 3410 together with AMS can be configured as the brain of the exemplary system and method. Data relevant to the users of the exemplary system and method can be stored in the database platform 3410. The database platform 3410, for example, can be configured to provide up to 3000 transactions per second per node, and can be top tuned for the Orion network.

Information Retrieval Systems

Game Server Scanners 3412

The game server scanners 3412 can be configured to perform the heavy duty probing action needed to retrieve the data that the end-users employ to determine which server 3414 to join. The game server scanners 3412 can perform requests to game servers 3414 worldwide and retrieve the corresponding data when responses are received. The game server scanners 3412 can receive information about where to go from the location information database 3416 that in turn gets its information from the network sniffers 3418-3422.

Location Information DB 3416

The location information database 3416 can be configured to perform the job of maintaining known IP addresses of game servers 3414 worldwide. For example, there can be between 100,000 and 500,000 IP addresses that are tracked and mapped. As the amount of games available in the Orion Network grows, so does the amount of IP addresses that the location information database 3416 can keep track of.

Sniffers 3418-3422

The network sniffers 3418-3422 can be configured as servers programmed with different sets of logic or which can operate for each other, if so chosen by the Orion Framework.

Broadband Network Layer 3-7/IDS Interface 3418

The broadband network interface 3418 interacts with the networks that the exemplary system and method is connected to. For example, if the exemplary system and method has a network known as a "last mile provider" (e.g., a broadband network) interlinked with the Orion core, the exemplary system and method can with the networks permission, query the network for type of traffic matching the exemplary system and method's predefined tables over game traffic. The exemplary system and method then can probe addresses that have several IP addresses sending traffic to their location. In other words, the exemplary system and method can have a threshold for traffic to a specific IP, with a specific known port pattern used, and the exemplary system and method can then probe to confirm/disprove a match of a running game server.

Public Master Browser Interface (Publishers/Developers) 3420

The public master browser interface 3420 can be programmed to interface directly with dedicated master servers that hold information about the game that they act as central hub for. In this case, the exemplary system and method attaches every X seconds and retrieves a full list of the IP addresses of the games servers 3414. There can be many such master browsers 3420 in operation and the Orion Framework can link up with them.

IP Range Scanner (and UDP Spiders/Crawlers) 3422

The IP range scanner interface 3422 can be configured to detect multiple IP addresses that originate on the same Class of IP addresses. For example, if IP range scanner 3422 detects more than 2 of a same game type or 3 of any of the known games on the same Class C (e.g., also known as /24 or the 255 addresses in an octet from IP ranges X.X.X.Y where Y is a Class C). The spiders and crawlers can be configured as small programs that do the same job as the IP range scanner 3422, except elsewhere on remote systems. In the exemplary system and method, a user can add an IP to favorites and Orion can be notified and proceed to scan that IP for information.

Experience Calibrated Match-Making Service
(FIGS. 35-38)

Game Servers 3414

The game servers 3414 can include computers at the homes of the end-users 3502, in datacenters around the world, and the like. The game servers 3414 can include an application that serves as the central distribution point for gamers playing game titles against each other.

Such a central application directing information can also be known as the game server or the dedicated game server (e.g., if no user use the same machine for end-user gaming at the same time). In the Orion Framework, the exemplary system and method can be configured for dealing with dedicated servers for statistical data collection.

The game server machines 3414, upon successful completion of a game match, can be configured to write logs to a folder that the Orion Stats daemon can gather information from and forward the gathered data to the stats crunchers 3602.

Stats Crunchers 3602

Figure 36:
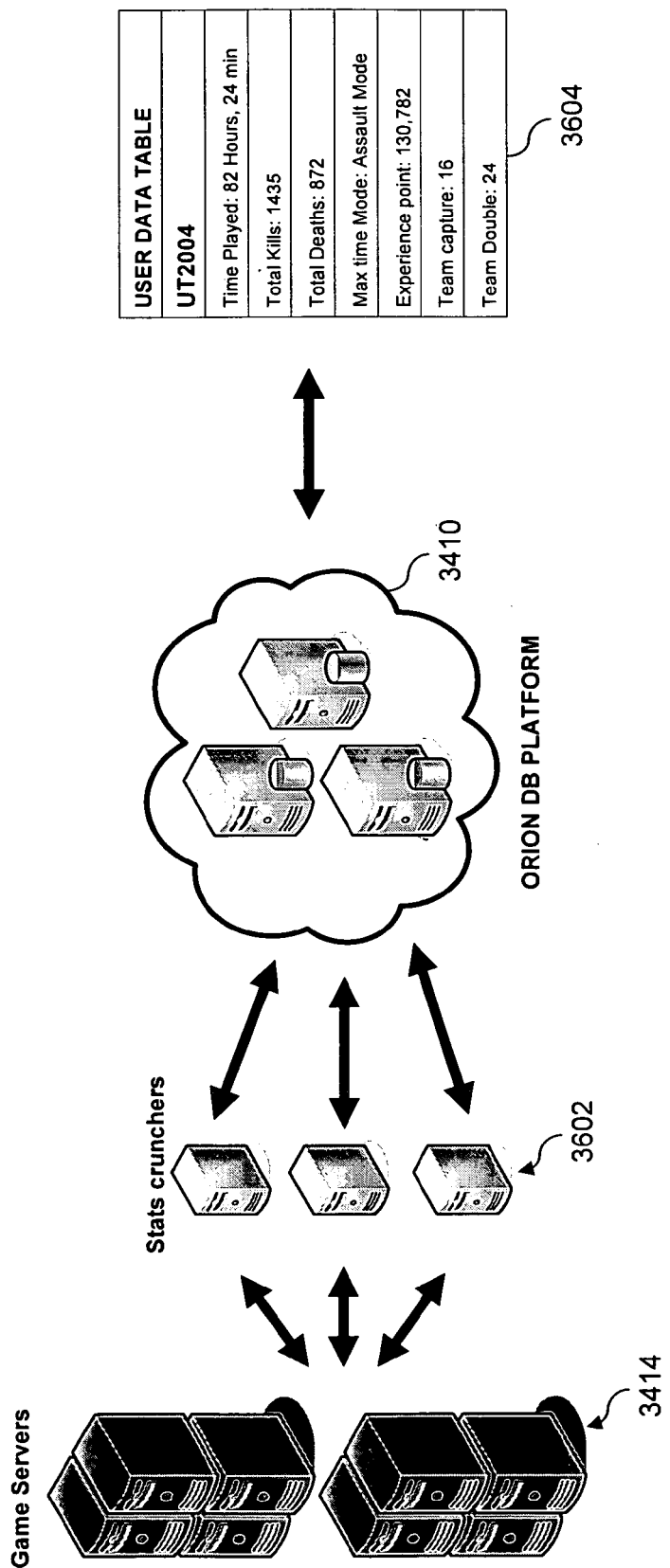

The stats crunchers 3602 machines (FIG. 36) can be configured to process a steady stream of data arriving for treatment. The Orion stats daemons sitting on the game servers 3414 can forward the data (e.g., compressed) to the stats crunchers 3602 and based upon what game the stats have been derived from, a selection process of relevant data can be performed. In FIG. 36, statistics processing is performed such that in order to operate the user experience calibrated server access modules the data can be gathered from each server 3414, for each player, and for each single play. In order to process the massive amount of data, the Orion Framework can have, for example, three independent statistical data crunchers 3602 dissecting the logs and log streaming data from each game server 3414 instance. Then all the relevant data 3604 is injected into the database cloud 3410.

Once the correct data is identified and separated, the data 3604 can be stored for database bulk insertions. The stats crunchers 3602 machines can be configured to be very powerful with massive CPUs (e.g., with 4 Dual AMD 64-bit Opteron per machine) so as to handle the very math intensive statistics crunching job.

DB Platform 3410

The Orion database platform 3410 is where the bulk inserts take place. The statistical data 3604 gathered can be appended to the users that played the relevant server 3414. The database platform 3410 can be configured to provide, for example, up to 3000 transactions per second per node, and can be top tuned for the Orion network.

Figure 35:
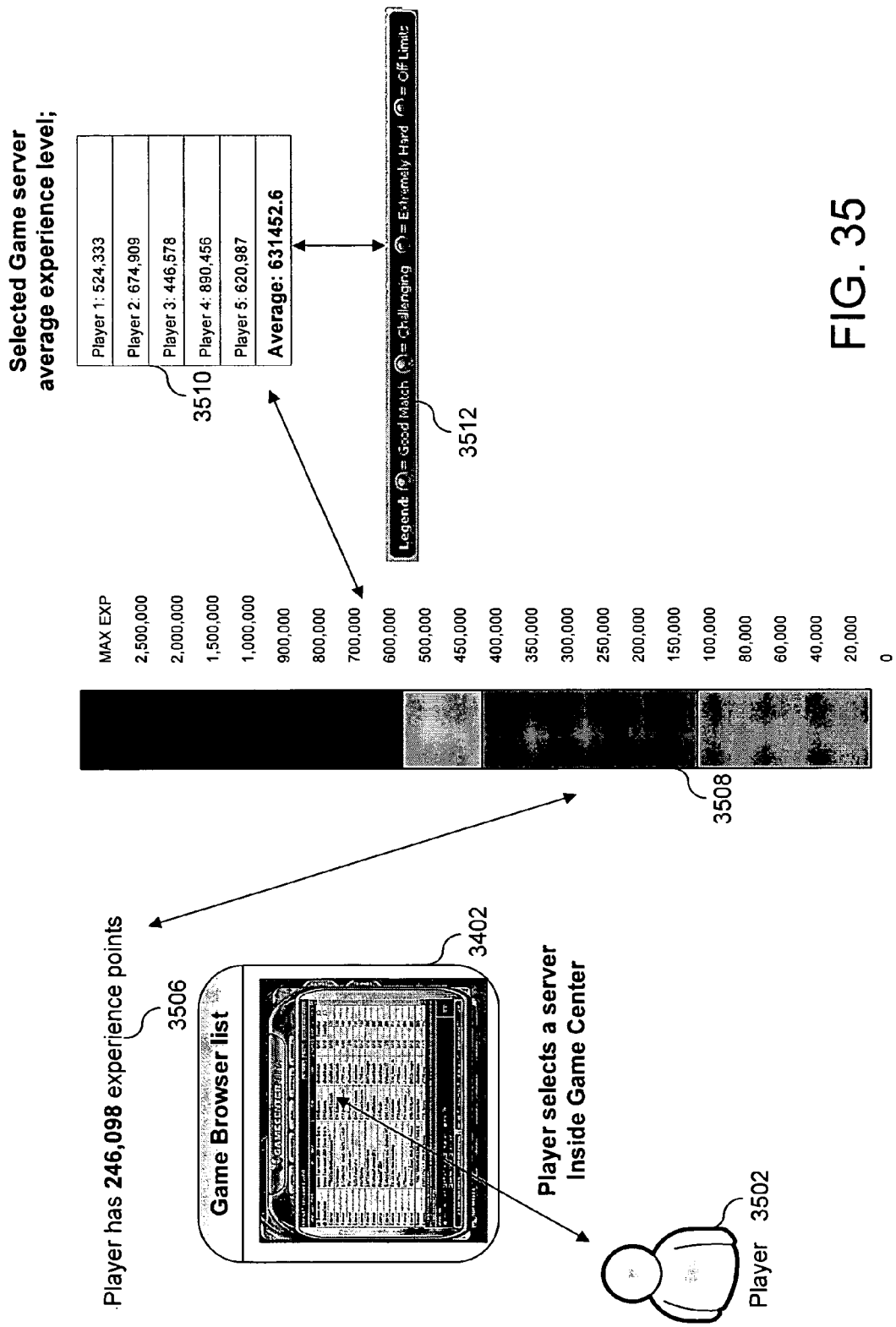
Figures 37, 38:
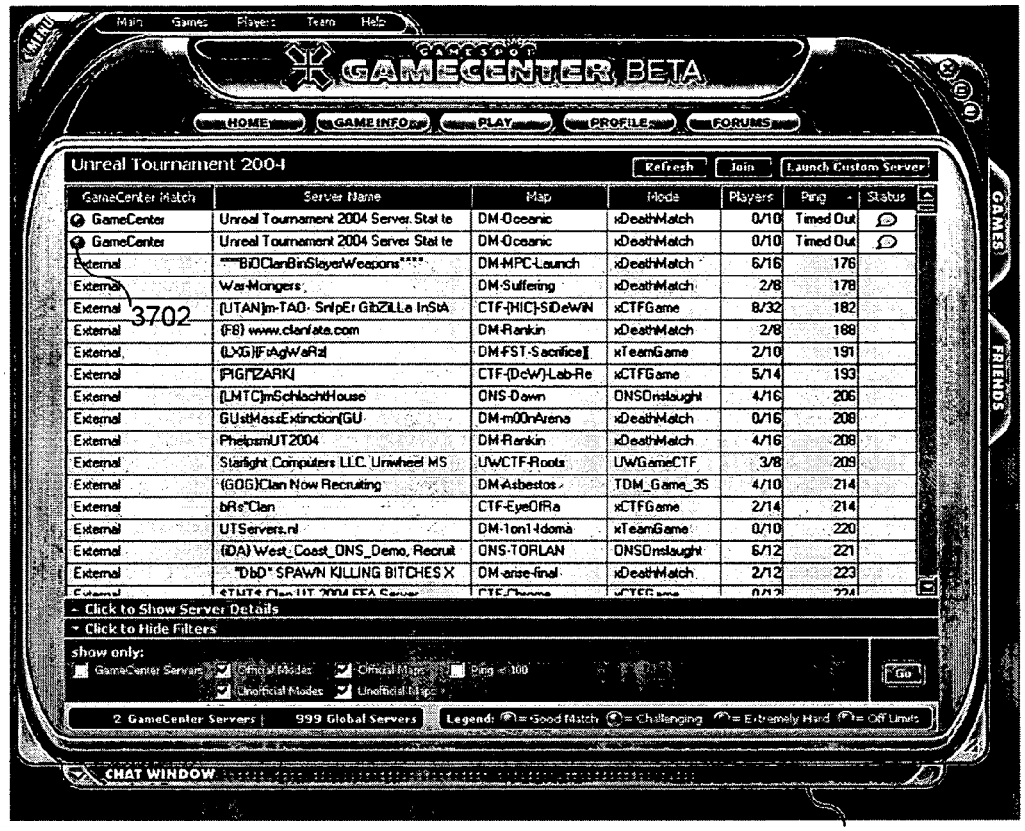

Enduser Scenario (FIGS. 35 and 37-38)

In an end-user scenario, for example, an end-user 3502 can look at a list of Unreal Tournament 2004 (UT2004) servers and find 2 types in the masterbrowser 3402 grid, which includes servers 3414 that are outside the network of the exemplary system and method, and servers 3414 that are inside the network of the exemplary system and method (FIG. 37, e.g., designated by a yellow band).

The game servers 3414 inside the network of the exemplary system and method that have the colored band can include an additional set of information that the outside servers need not employ. The Orion servers that are listed can include a color designation listed next to them for describing how the individual user looking at the servers compares to the other players on those servers. The calculation made to determine how the user compares to the current players on the servers is done by comparing the skill level 3506 of the user 3502 based on the statistical information that the exemplary system and method has gathered on the user while playing, as compared to the average dataset from the same information 3510 of the players on a given game server 3414 (FIG. 35).

In FIGS. 35-38, an experience calibrated server access is provided, such that when the servers are displayed in the Master Browser 3402 they all have an icon 3702 showing what average experience level the current users on the server have relative to the player 3502 who is viewing the Master Browser 3402. A legend 3512 shows what the player 3502 can expect by joining the server 3414, wherein if the indicator is grey, the user is barred from even accessing the server at all, as it would simply be unfair to the users currently on the server and therefore they are protected against players with much higher experience to join and kill them all. Accordingly, the level bar 3512 (FIGS. 37-38) can be added with corresponding color codes to inform the user 3502 of what kind of gaming experience the user 3502 can expect when joining a given game server 3414 (e.g., if the game server is not blocked).

Dynamic Multiplayer Server Component Auto
Deployment and Aggregation System (FIG. 39)

The server launching component (FIG. 39) is configured for anticipating what the demand is for the end-users 3502. The launching system can be configured to be self correcting, self healing, can employ advanced algorithms, can determine when and what game server type (e.g., instances) to deploy, and the like. In FIG. 39, dynamic server launching can include a dynamic multiplayer server component auto deployment and aggregation system. The system operates on a base-line with all games present. As a game titles start to fill up, the system begins to launch servers 3414 for that title (and the game type) based on predefined triggers and pre-emptive algorithms. The system also takes into account how many user defined game instances have been launched and keeps persistent state data for all users and servers inside the Orion Framework.

AMS Central Nexus 3904

The AMS central nexus system 3904 is configured to hold the self-adapting scaling algorithms used by the Orion Network to determine when and where to execute applications (e.g., game instances). The AMS central nexus system 3904 can be configured as set of servers that store data on the Orion Database 3410. The AMS central nexus system 3904 also can function as the monitoring system to verify data coming in from the AMS Proxy Nodes 3406.

AMS Proxy Nodes 3906

The AMS proxy nodes 3906 can be configured as servers that serve as the distribution link for the AMS Central Nexus 3904. The AMS proxy nodes 3906 can communicate directly to the AMS Client Daemon 3908. The AMS proxy nodes 3906 machines can be configured to scan all suitable game servers 3414 at all suitable times to retrieve data needed for other systems, such as the Master Browser 3402, and the like. The data gathered by the AMS proxy nodes 3906 can be used by publishers and developers for deep analysis regarding their respective game titles and how they perform. The AMS Proxy nodes 3906 can be configured as a direct link with the game servers 3414.

AMS Client Daemon 3908

The AMS client daemon 3908 can be configured as a small piece of code residing on the game servers 3414. The AMS client daemon 3908 can take the encrypted commands sent by the AMS system and execute the commands on a respective game machine 3414. The AMS client daemon 3908 code can be configured to run on various Operating Systems (e.g., including Linux, Windows, etc.). The AMS client daemon 3908 can be configured as a services agent doing few transactions on a server 3414, to a full-blown interface doing all communication securely, reliably and asynchronous with the main control system, and the like.

Game Servers 3414

The game servers 3414 can be configured as high-end dual CPU based rack-mounted servers with custom made OS (e.g., when Linux is employed) or Microsoft Windows running in a custom configuration (e.g., SCI based). The game servers 3414 retrieve game titles from a storage device, as needed.

Usage Algorithm 3902

The usage algorithm 3902 is employed for continuously updating the data-set based on various parameters, such as month, day, time, season, game title releases, news and movie feature time proximity, patch releases, ladders/tournaments interaction, instance critical mass marker, other factors that influences the employed game type instances at any given point, and the like.

DB Platform 3410

The Orion database platform 3410 is the brain (together with the AMS system) of the exemplary system and method. In the Orion database platform 3410, all data relevant to a user resides. The Orion database platform 3410 can provide up to 3000 transactions per second per node, and can be top tuned for the network of the exemplary system and method.

Figure 40:
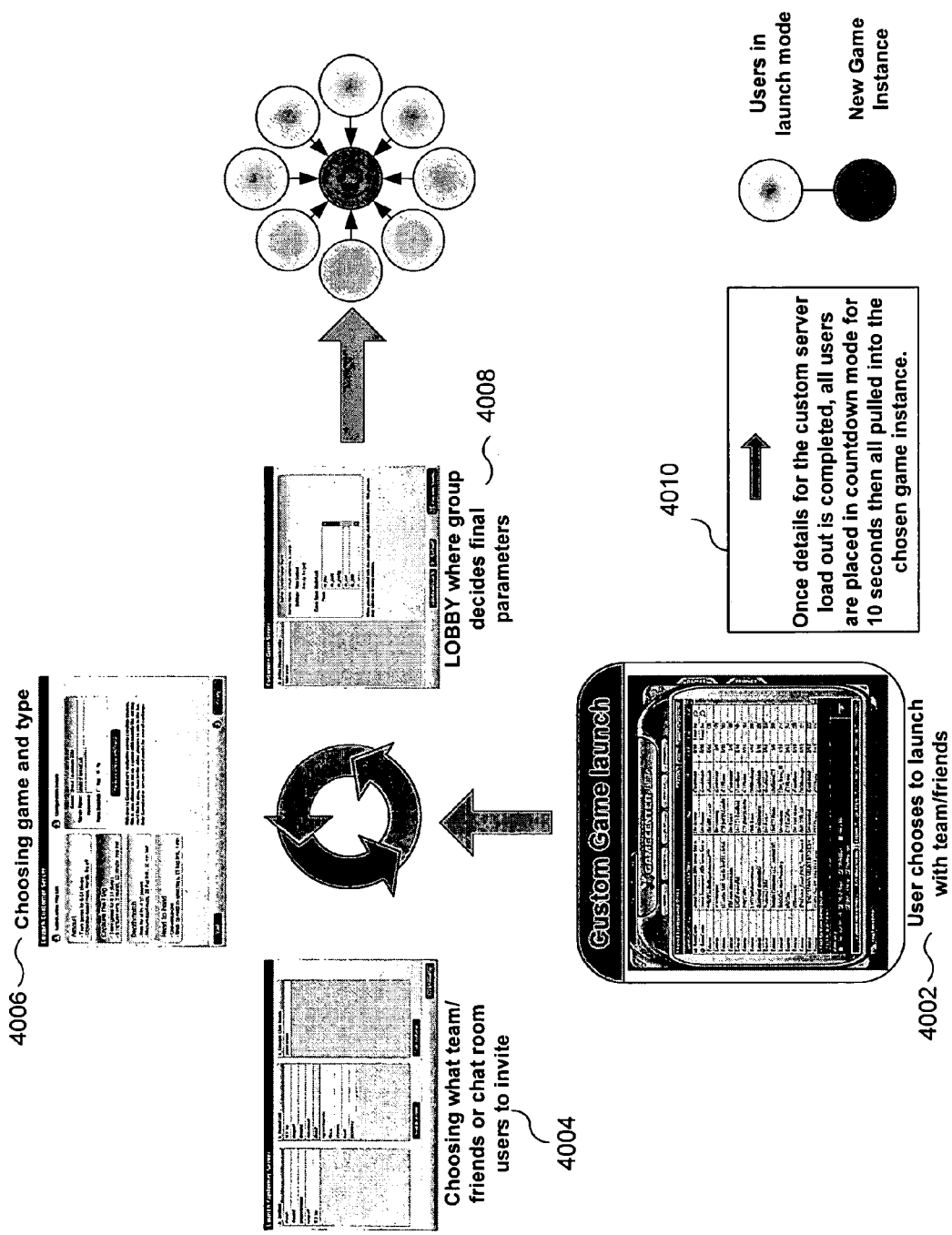
Figure 41:
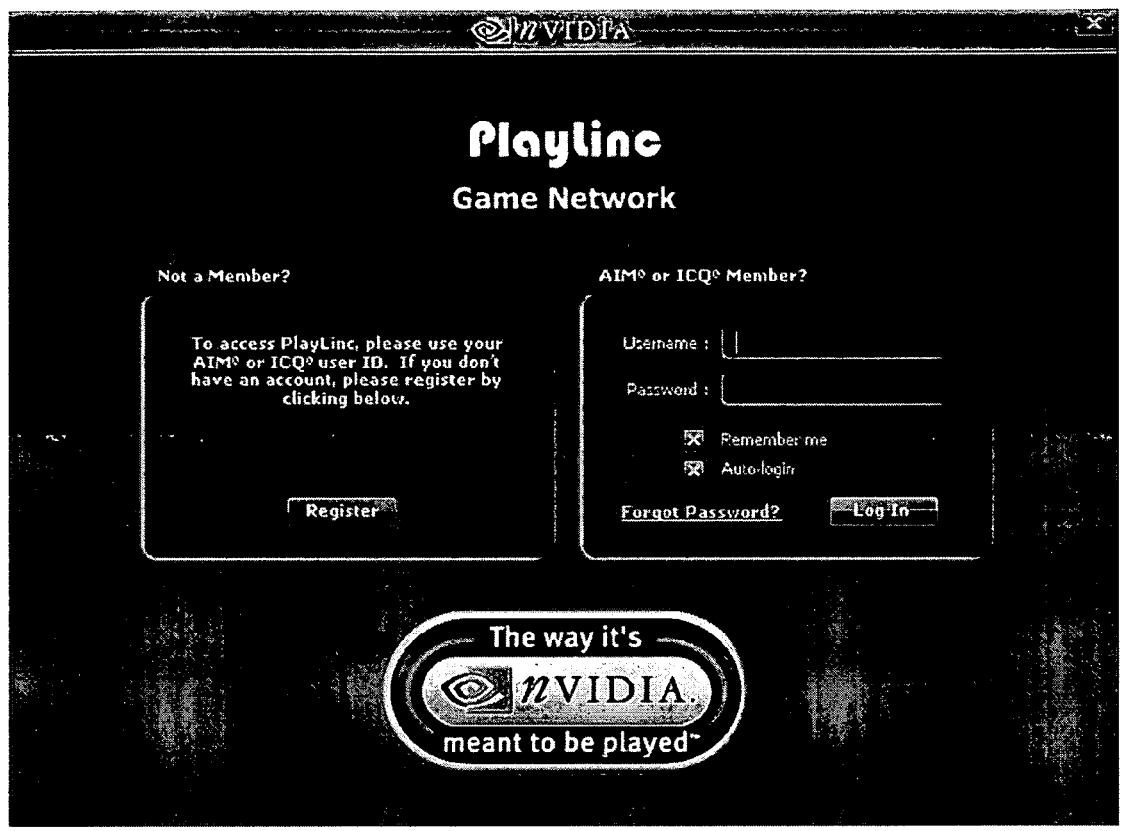
FIGS. 41-82 further illustrate the collaborative online gaming system and method of FIGS. 1-40, according to further exemplary embodiments.
Figure 42:
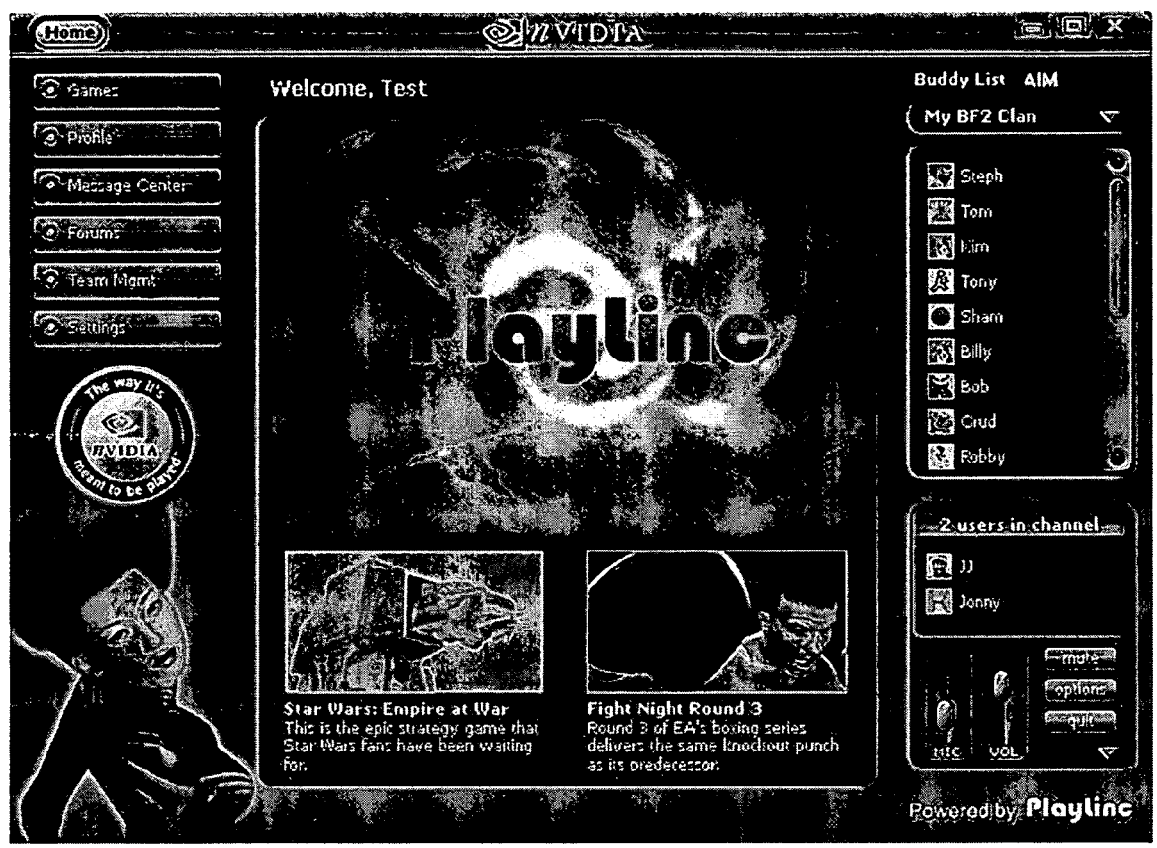
Figure 43:

Lobby Centric Simultaneous and Collaborative Client Game Play Launching (FIG. 40)

This component can be configured as a lobby centric, simultaneous and collaborative client game play launching feature working across multiplayer games.

User Chooses to Launch with Team/Friends (Step 4002)

In operation, a user locates a game in the master browser he/she wants to play. From here (or from top menu), the end-user can choose to launch a custom game server (e.g., game instance) or a game over the Game Area Network (GAN). Once the game type is chosen, the quick launch control screen appears. This is the place where the user can either choose to launch a pre-configured solution that matches the users wish or decide to setup the server with more parameters available. Once the game type pre-choices are selected, the user can now access the invitation screen to setup a team vs. team skirmish on a hosted server or GAN environment of the exemplary system and method or simply invite other people from the game type specific chat channel or known user list.

Choosing What Team/Friends or Chat Room Users to Invite to Lobby (Step 4004)

In this screen mode, the users from a team list, a known users list, a current chat room, and the like, show up. If users get invited to play a game, they receive a popup bubble with the information of the launch sequence they are invited to. They can accept or deny the game invitation. Once accepted, they are placed in the launch specific chat channel. This is also where everyone will end up once the skirmish or match is completed.

Choosing Game and Type (Step 4006)

This allows the game originator to change the game type, even after people are invited. This allows for people playing many game types to have more interactive launch sessions.

The Custom Lobby with Users Collaboratively Decides the Final Parameters (Step 4008)

After being invited and accepting invitation to the game lobby, the users can now discuss how the game instance (e.g., dedicated game server) should look and how it should be configured. For example, this is where the MOD (modification), map rotation and voice server configuration can be decided. Once agreed, the originator (also referred to as the game launch commander) of the game server setup, also known as the inviter, can send a command to the exemplary system and method to build the server with the requested parameters. Once the game server is built and ready for launch, the team finally decides if they are ready to deploy.

Countdown to Server Launch (step 4010)

At this point the game instance (e.g., dedicated game server or GAN network) has completed its 30-45 sec building sequence and is ready to deploy. The launch commander executes the deployment and the users are put into a 5-10 second countdown. If at this point users wish to abort the joining of that server, they can still avoid the client side game execution up until the final countdown is completed.

Launch Keys Transferred

Once the countdown sequence is completed, the exemplary system and method transfers command codes securely to all the people in the lobby that are supposed to join the game. The encrypted data stream sent to the Client application of the exemplary system and method sitting on the end-users desktop informs the game being launched of the correct parameters and initiates the voice control system, if it was requested (and not already in use).

On-Game Menu system (FIGS. 67-71)

This component allows for on-game communication and controls through the on-game menu system. This technology is essentially a multi-layered interface on top of the game that allows data to flow to the end-user simultaneous with the game in progress. This menu system can be called at any time while inside the game on the client machine. The technology is called by a hotkey (key combination) and then appears on top of the game in progress.

Figure 67:

Using the on-Game Menu System 6702 (FIG. 67)

The menu 6702, when called with hotkey, allows the end-user to choose between several options to assist the user with retrieving data or communicate with friends on the IM network. The options include; Chat, Voice controls, Remote Server control (RCON), information retrieval via web browser interface and a strategy interface to retrieve data about the game in real-time.

Technology Behind on-Game Interface

In order to provide the end-user with the options available from the on-game menu selection, the technology is using several unique properties of the Windows operating system and access to high-end graphics accelerator hardware via the GPU (Graphic Processing Unit) interface. It is capable of interfacing through DirectX 8, DirectX 9, OpenGL 1 and OpenGL 2. This covers the majority of the underlying technologies used for video games in the market today. The technology is multi-threaded and is dual-core CPU (Computing Processing Unit) aware. That means that the On-game technology uses its ability to detect multi-core CPU based hardware and utilize the acquired information to place the processing power needed to operate the On-game technology on the least used CPU core. Being multi-threaded furthermore allows the individual frame-rate of the on-game technology to stay independent of the videogame frame-rate and deliver smooth and accurate rendering at any time inside the videogame. The web browser interface re-projects data into the On-game interface as images with hot-zones to make navigating the web content possible. This unique part of the On-game system allows users to retrieve data from the World Wide Web and interact with the data while still in control of display size of the presented data.

Figure 68:
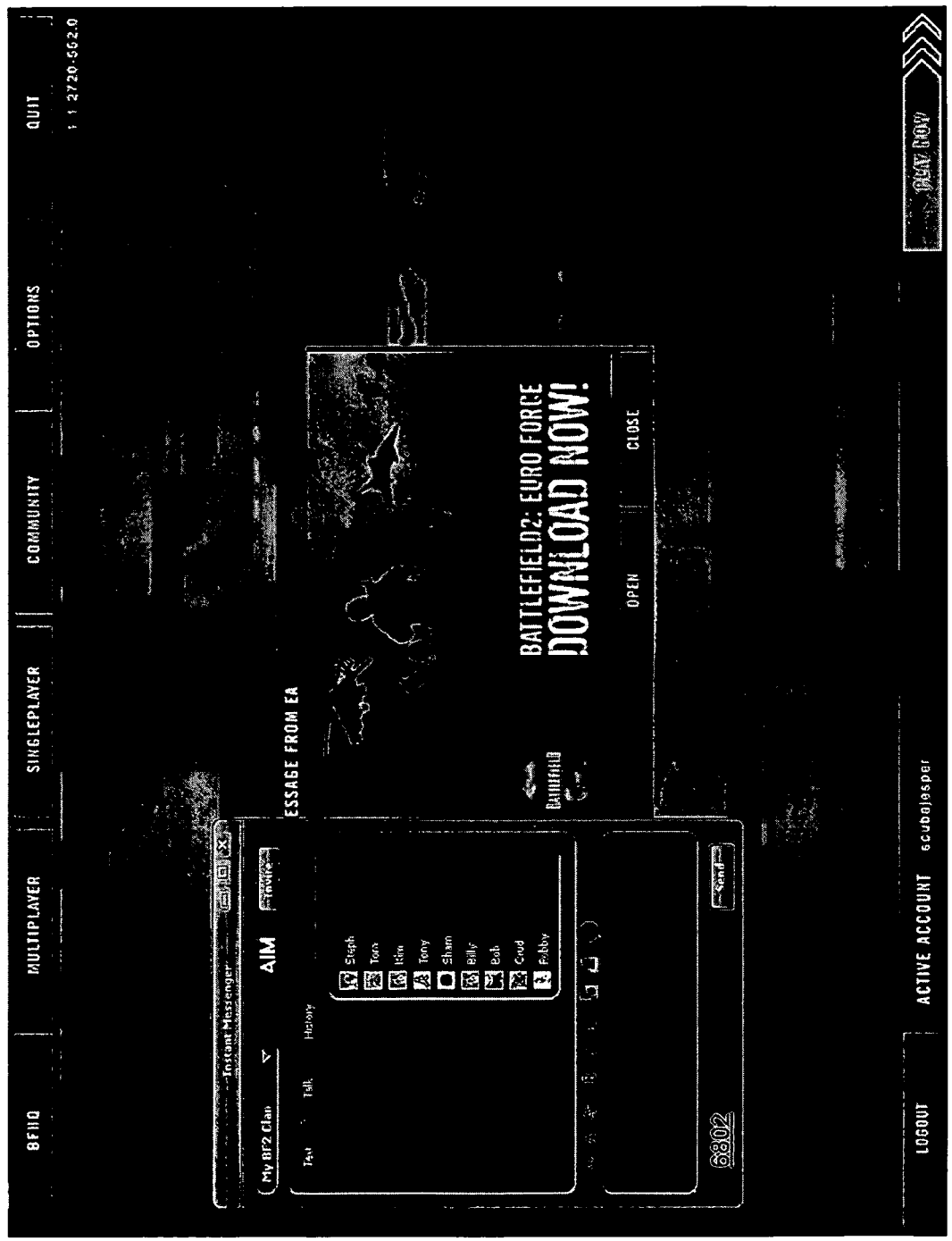

On-Game Chat Interface 6802 (FIG. 68)

This On-game Menu option allows users to instant message their friends and team-mates via the AIM and ICQ network. It allows the end-user to open multiple conversations in real-time and receives chat traffic while in-game. The system furthermore has the ability to notify a user when a message is sent to the end-user while end-user is currently engaged in playing the video game. This interface is an extension of the ability of the exemplary system and method to do the same outside the video game when using the client of the exemplary system and method.

Figure 69:
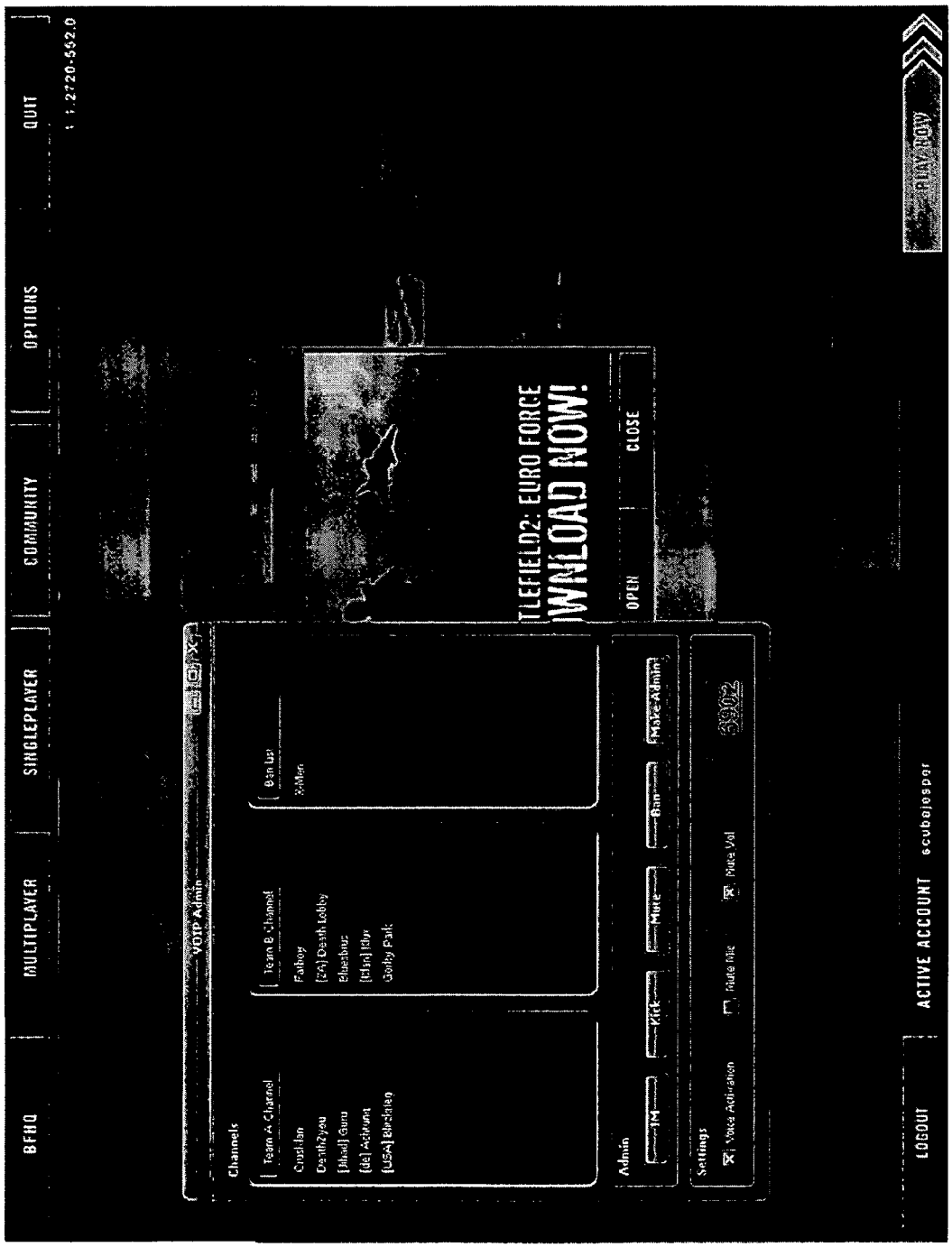

On-Game VoIP Admin Interface 6902 (FIG. 69)

While an end-user can initiate VoIP while preparing the launch from the client of the exemplary system and method before entering into a video game, the user can in addition now control the created voice channels if so permitted by the access levels set on the team management interface in the exemplary system and method. The end-user can now move people between channels, kick users, ban users and mute un-wanted communication from users not following the intended use of the VoIP system. This interface is likewise completely accessible while playing the game.

On-Game RCON Interface

This interface, also available from the On-Game menu, will allow the end-users with the correct administrative permissions for the video game in progress, to interact with the server to control map cycles, kicking users, banning users, changing game play and game specific MOD (Modified gaming content) while the video game in progress.

Figure 70:
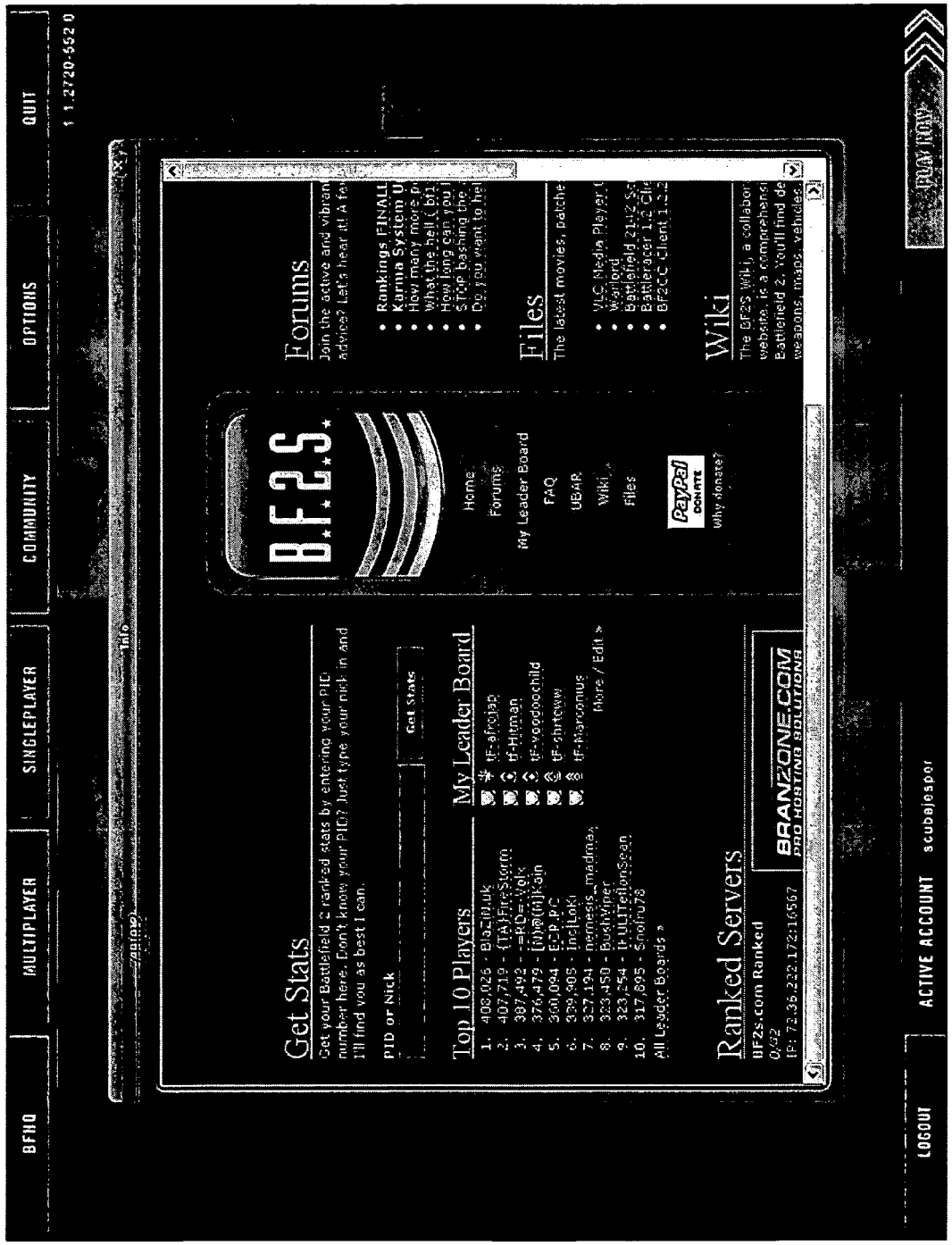

On-Game Information (INFO) Interface 7002 (FIG. 70)

The ability to retrieve live data from the web while inside the video game while in progress is very important to most video game players. It allows the user to gain access to statistics, general community generated game specific data and any number of data that assist the end-user in the experience. This also allows Developers and Publishers to transmit data to the end-user about upcoming events or even life data from tournaments, ladders and leagues. With the ability to visit any destination on the web while emerged in video game play is a massive enhancement to most games.

Figure 71:
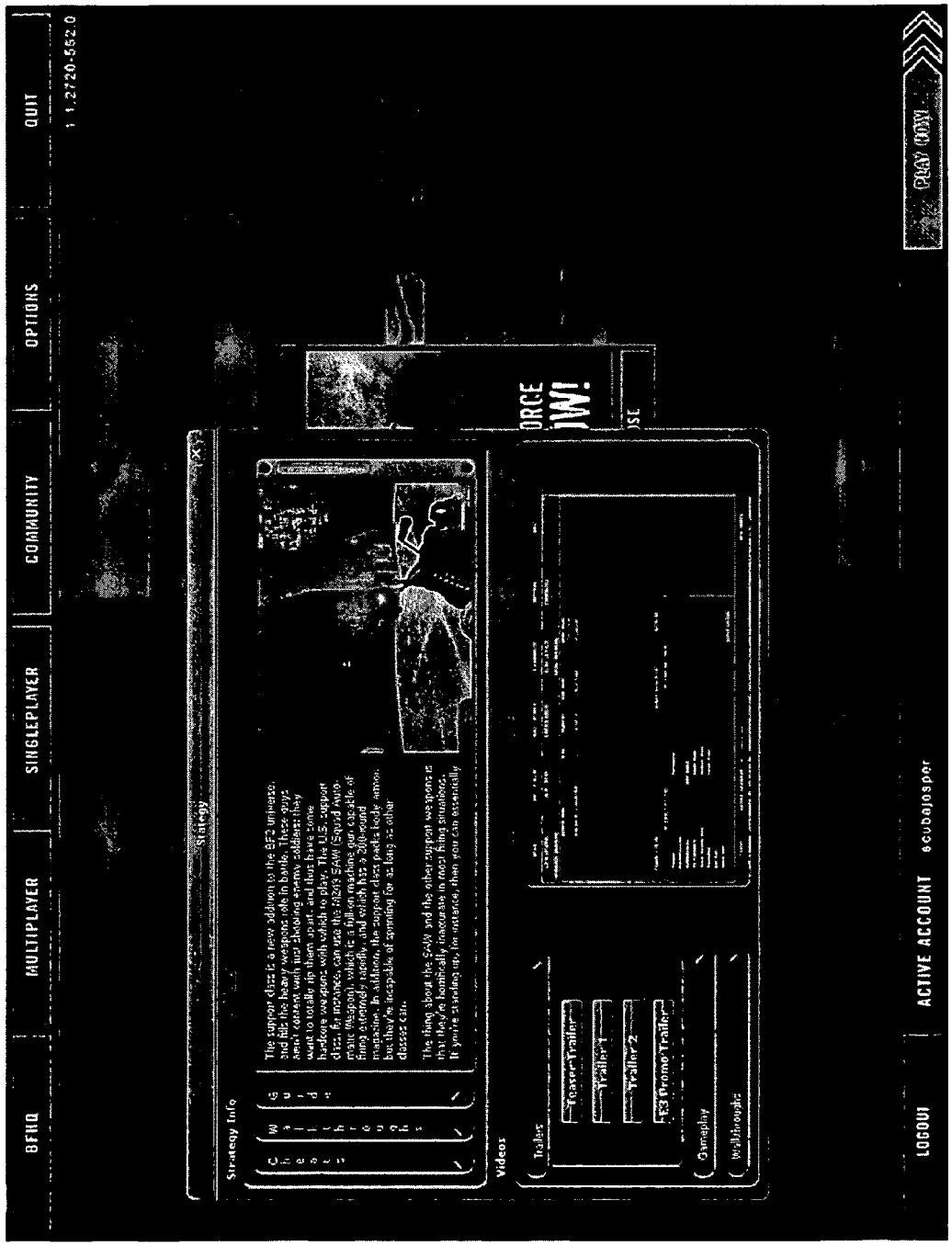
Figure 72:
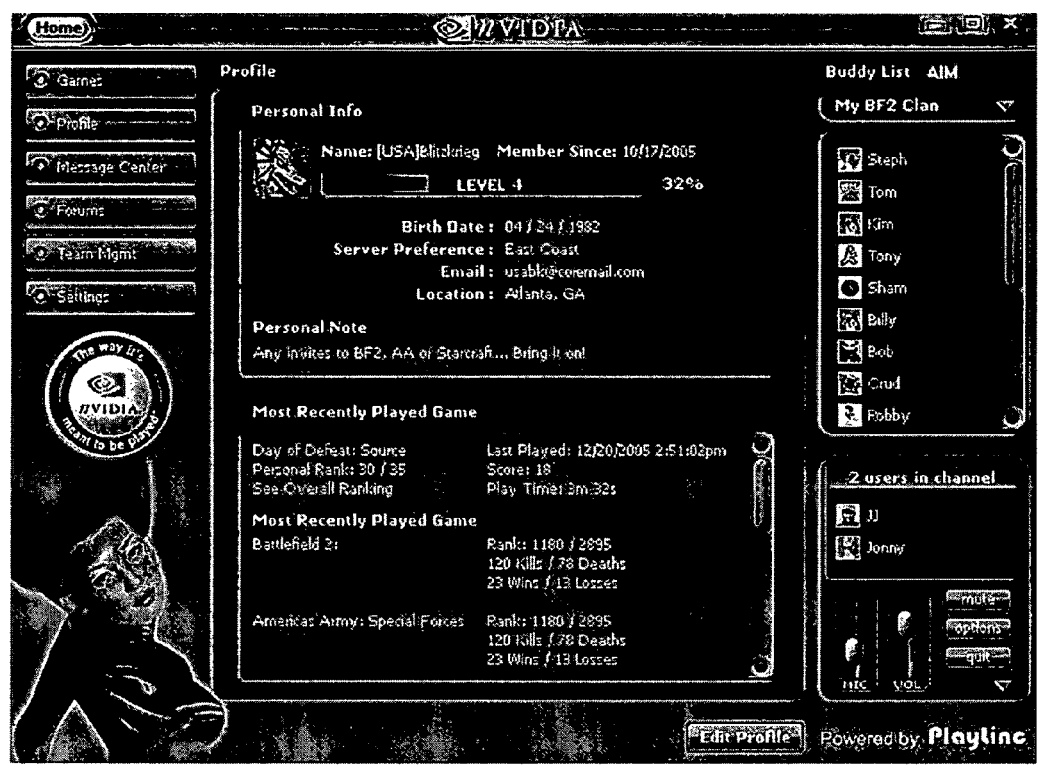
Figure 73:
Figure 74:
Figure 75:
Figure 76:

On-Game Strategy Information Screen 7102 (FIG. 71)

This interface allows end-users to retrieve game specific information regarding the video game they currently are engaged with. The ability to retrieve walkthroughs, general game guides and cheats (developer implemented codes to gain special attributes above normal game play features like GOD or FULL AMMO mode) allows the user to stay in game and still have access to relevant information about the game. The Video display section allows a user to view all video related material for the video game in real-time (e.g., streamed from media servers of the exemplary system and method, Publisher or content provider media servers, etc.). It allows the end-user to view trailers, video walkthrough and general game play (including end-user created and recorded content) on top of the game while video game is in progress. This interface also allows the exemplary system and method to stream live events such as tournaments directly into the video game while the end-user participates or just view the tournament.

On-Game Advertising Serving

The on-game multi-layered display capabilities can also display and rich multi-media data directly into the game without any end-user interaction. This allows the Publisher to display streaming video ads of next generation games while the end-user is still playing the game.

The above-described devices and subsystems of the exemplary embodiments can include, for example, any suitable servers, workstations, PCs, laptop computers, PDAs, Internet appliances, handheld devices, cellular telephones, wireless devices, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the exemplary embodiments are for exemplary purposes, as many variations of the specific hardware used to implement the exemplary embodiments are possible, as will be appreciated by those skilled in the relevant art(s). For example, the functionality of one or more of the devices and subsystems of the exemplary embodiments can be implemented via one or more programmed computer systems or devices.

To implement such variations as well as other variations, a single computer system can be programmed to perform the special purpose functions of one or more of the devices and subsystems of the exemplary embodiments. On the other hand, two or more programmed computer systems or devices can be substituted for any one of the devices and subsystems of the exemplary embodiments. Accordingly, principles and advantages of distributed processing, such as redundancy, replication, and the like, also can be implemented, as desired, to increase the robustness and performance of the devices and subsystems of the exemplary embodiments.

The devices and subsystems of the exemplary embodiments can store information relating to various processes described herein. This information can be stored in one or more memories, such as a hard disk, optical disk, magneto-optical disk, RAM, and the like, of the devices and subsystems of the exemplary embodiments. One or more databases of the devices and subsystems of the exemplary embodiments can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases thereof.

All or a portion of the devices and subsystems of the exemplary embodiments can be conveniently implemented using one or more general purpose computer systems, microprocessors, digital signal processors, micro-controllers, and the like, programmed according to the teachings of the exemplary embodiments of the present inventions, as will be appreciated by those skilled in the computer and software arts. Appropriate software can be readily prepared by programmers of ordinary skill based on the teachings of the exemplary embodiments, as will be appreciated by those skilled in the software art. Further, the devices and subsystems of the exemplary embodiments can be implemented on the World Wide Web. In addition, the devices and subsystems of the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present inventions can include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the devices and subsystems of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of the appended claims.

What is claimed is:

1. A method for collaborative online gaming, comprising the steps of:
   enabling access to a central repository master browser system that shows games currently running or available to run on one or more computer processors as well as on a plurality of servers communicately coupled to the one or more computer processors over communications links;
   processing statistical data representative of experience levels of players of the games and comparing the statistical data for different players;
   automatically deploying additional ones of said plurality of servers as said games fill up with players, said deploying being based on one or more of predetermined triggers and pre-emptive algorithms including how many user defined game instances have been launched and what anticipated end user demand will be;
   inviting players interested in joining a game into a game lobby where the players can collaborate on the configuration of the game; and
   launching the game play from the game lobby at an agreed upon time.

2. The method of claim 1, further comprising supplying video game screen over-layer technology effective to give players access to a video game control interface while inside a video game being played.

3. The method of claim 1, further comprising implementing the method via a computer program product including one or more computer-readable instructions embedded on a computer readable medium and configured to cause one or more computer processors to perform the steps of the method.

4. The method of claim 1, further comprising implementing the method via one or more hardware and software components configured to perform the steps of the method.

5. A system of collaborative online gaming, comprising:
   means for enabling access to a central repository master browser system that shows games currently running or available to run on one or more computer processors as well as on a plurality of servers communicately coupled to the one or more computer processors over communications links;
   means for processing statistical data representative of experience levels of players of the games and comparing the statistical data for different players;
   means for automatically deploying additional ones of said plurality of servers as said games fill up with players, said deploying being based on one or more of predetermined triggers and pre-emptive algorithms including how many user defined game instances have been launched and what anticipated end user demand will be;
   means for inviting players interested in joining a game into a game lobby where the players can collaborate on the configuration of the game;
   means for launching the game play from the game lobby at an agreed upon time; and
   means for providing a video game screen over-layer technology giving users access to a video game control interface while inside a video game being played.

6. The system of claim 5, further comprising means for providing a framework included as part of a backend for implementing the system.

7. The system of claim 5, wherein the system includes a computer program product including one or more computer-readable instructions embedded on a computer readable medium and configured to cause one or more computer processors to implement the system.

8. The system of claim 5, wherein the system includes one or more hardware and software components configured to implement the system.

9. A computer program product for collaborative online gaming including one or more computer-readable instructions embedded on a non-transitory computer readable medium and configured to cause one or more computer processors to perform the steps of:

enabling access to a central repository master browser system that shows games currently running or available to run on the one or more computer processors as well as on a plurality of servers communicately coupled to the one or more computer processors over communications links;

processing statistical data representative of experience levels of players of the games and comparing the statistical data for different players;

automatically deploying additional ones of said plurality of servers as said games fill up with players, said deploying being based on one or more of predetermined triggers and pre-emptive algorithms including how many user defined game instances have been launched and what anticipated end user demand will be;

inviting players interested in joining a game into a game lobby where the players can collaborate on the configuration of the game; and launching the game play from the game lobby at an agreed upon time.

10. The computer program product of claim 9, comprising further instructions embedded on the non-transitory computer readable medium and configured to cause the one or more computer processors to perform the step of providing a framework included as part of a backend for performing the steps of the method.

\* \* \* \* \*